US012750184B2

(12) United States Patent
Chen et al.

(10) Patent No.: US 12,750,184 B2
(45) Date of Patent: Sep. 29, 2026

(54) METHOD AND DEVICE FOR WIRELESS COMMUNICATION WITH DISCONTINUOUS RECEPTION AND LINK MONITORING

(71) Applicant: Apogee 5G Global, LLC, Plano, TX (US)

(72) Inventors: Yu Chen, Shanghai (CN); Qiaoling Yu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 478 days.

(21) Appl. No.: 18/218,011

(22) Filed: Jul. 4, 2023

(65) Prior Publication Data

US 2024/0014974 A1 Jan. 11, 2024

(30) Foreign Application Priority Data

Jul. 8, 2022 (CN) ......................... 202210805034.2
Sep. 13, 2022 (CN) ......................... 202211109328.8

(51) Int. Cl.

*H04L 5/00* (2006.01)
*H04W 24/08* (2009.01)
*H04W 72/232* (2023.01)
*H04W 76/28* (2018.01)

(52) U.S. Cl.

CPC ........... *H04L 5/0051* (2013.01); *H04W 24/08* (2013.01); *H04W 72/232* (2023.01); *H04W 76/28* (2018.02)

(58) Field of Classification Search

CPC .. H04L 5/0051; H04W 24/08; H04W 72/232; H04W 76/28
USPC .......................................................... 370/252
See application file for complete search history.

(56) References Cited

U.S. PATENT DOCUMENTS

2021/0105827 A1* 4/2021 Tsai ...................... H04W 76/28
2023/0026297 A1* 1/2023 Kim ...................... H04W 76/28

* cited by examiner

*Primary Examiner* — Rownak Islam
(74) *Attorney, Agent, or Firm* — Volpe Koenig

(57) ABSTRACT

The present application discloses a method and a device for wireless communications, including: receiving a first signaling, the first signaling used for configuring DRX of a first cell group; the DRX of the first cell group configured by the first signaling being for a first MAC entity; and listening over a PDCCH within active time of any DRX group corresponding to the first cell group; and performing a first radio link quality evaluation of a first reference signal resource set within a first evaluation cycle to determine whether a result of the first radio link quality evaluation is worse than a first threshold. Through the first signaling, the present application not only can support more flexible DRX but also ensures the performance of link monitoring.

20 Claims, 4 Drawing Sheets

METHOD AND DEVICE FOR WIRELESS COMMUNICATION WITH DISCONTINUOUS RECEPTION AND LINK MONITORING

CROSS REFERENCE TO RELATED APPLICATIONS

This application claims the priority benefit of Chinese Patent Application No. 202210805034.2, filed on Jul. 8, 2022, and claims the priority benefit of Chinese Patent Application No. 202211109328.8, filed on Sep. 13, 2022, the full disclosure of which is incorporated herein by reference.

BACKGROUND

Technical Field

The present application relates to transmission methods and devices in wireless communication systems concerning the enhancement of Quality of Services (QoS) and interactive traffic transmission, and in particular to a method and a device for XR services.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

In communications, both Long Term Evolution (LTE) and 5G NR involves correct reception of reliable information, optimized energy efficiency ratio (EER), determination of information validity, flexible resource allocation, elastic system structure, effective information processing on non-access stratum (NAS), and lower traffic interruption and call drop rate, and support to lower power consumption, which play an important role in the normal communication between a base station and a User Equipment (UE), rational scheduling of resources, and also in the balance of system payload, thus laying a solid foundation for increasing throughput, meeting a variety of traffic needs in communications, enhancing the spectrum utilization and improving service quality. Therefore, LIE and 5G are indispensable no matter in enhanced Mobile BroadBand (eMBB), Ultra Reliable Low Latency Communication (URLLC) or enhanced Machine Type Communication (eMTC). And a wide range of requests can be found in terms of Industrial Internet of Things (IIoT), Vehicular to X (V2X), and Device to Device (D2D), Unlicensed Spectrum communications, and monitoring on UE communication quality, network plan optimization, Non Terrestrial Network (NTN) and Terrestrial Network (TN), Dual connectivity system, or combined, radio resource management and multi-antenna codebook selection, as well as signaling design, neighbor management, traffic management and beamforming. Information is generally transmitted by broadcast and unicast, and both ways are beneficial to fulfilling the above requests and make up an integral part of the 5G system. The UE's connection with the network can be achieved directly or by relaying.

As the number and complexity of system scenarios increases, more and more requests have been made on reducing interruption rate and latency, strengthening reliability and system stability, increasing the traffic flexibility and power conservation, and in the meantime the compatibility between different versions of systems shall be taken into account for system designing.

The 3GPP standardization organization has worked on 5G standardization to formulate a series of specifications, of which the details can refer to:

https://www.3gpp.org/ftp/Specs/archive/38_series/38.331/38331-g60.zip https://www.3gpp.org/ftp/Specs/archive/38_series/38.331/38321-g60.zip

SUMMARY

In a communication system, the R18 of the 3GPP added a study item of XR traffics, which include VR, AR and CG traffics featured with high rate and low latency, and due to the fact that these traffics are interactive, the response time for traffics is very demanding. For one thing, XR traffics are widely involved in high-rate and high-definition time-frequency transmissions, which are power consuming, hence the need to support DRX for power conservation; for another, the arrival of traffic data has its intrinsic properties and requirements, for instance, the data for a kind of traffic may need to be transmitted once per 16.67 ms, but the present DRX mechanism isn't adaptable to such request. If adopting an approximate value of 16 ms, which means to wake up every 16 ms, then after a period of accumulation, the time gaps between occasions for wakeup and times for actual traffic transmissions will get larger and larger, namely, each time when the user wakes up, it has to wait for a longer period before it can receive traffic data. If so, even Discontinuous Reception (DRX) can hardly contribute to power saving. Therefore, it will be necessary to design a power-saving mechanism that matches with XR or traffics having similar demands, so as to support for instance a non-integral transmission periodicity. Researchers find that if the time for listening over PDCCH is added in the currently supported DRX cycle, for instance, if provided with a DRX cycle of 50 ms, but configured with 3 DRXs, one can also obtain a non-integral periodicity of 16.67 ms. But the DRX cycle not only can conserve power but works on the measurements. In signal measurements, the DRX cycle serves as an important parameter, which influences a set of targets and behaviors of measurement. Adding some extra PDCCH listening time, for example, adding a new active time, is equivalent to the usage of a shorter DRX cycle, but with better compatibility. The evaluation cycle of measurements shall take into account such circumstance, for instance given a DRX cycle of 50 ms, by adding the time of listening over PDCCH, an equivalence of 16.67 ms DRX cycle can be acquired. The present measurement evaluation cycle shall make a proper adjustment to this case, otherwise the performance of link monitoring cannot be guaranteed. It remains a key issue to determine an evaluation cycle of measurements. In some cases, the DRX cycle among all input parameters can be modified, but if there is only one DRX cycle being configured, for instance 50 ms, it will be simpler and easier to directly use the already-configured DRX cycle. Therefore, to support new DRX configurations of XR traffics, other methods, including comprehensive ones, can be taken into account when determining an evaluation cycle of measurements.

To address the problem presented above, the present application provides a solution.

It should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict. Besides, the method proposed in the present application can also be used for addressing other issues confronting communications.

The present application provides a method in a first node for wireless communications, comprising:

receiving a first signaling, the first signaling used for configuring DRX of a first cell group; the DRX of the first cell group configured by the first signaling being for a first MAC entity;

and listening over a PDCCH within active time of any DRX group corresponding to the first cell group;

performing a first radio link quality evaluation of a first reference signal resource set within a first evaluation cycle to determine whether a result of the first radio link quality evaluation is worse than a first threshold;

herein, the first signaling comprises a first time length set, the first time length set comprising at least a first time length; any time length in the first time length set is a first-type DRX cycle; a system frame number, a subframe number and the first time length set are used together to determine a first time window set; the active time of the DRX group corresponding to the first cell group comprises the first time window set; a time interval between any two adjacent time windows in the first time window set is a candidate time interval in a first candidate time interval set and the first candidate time interval set comprises at least a first time interval and a second time interval, the first time interval being unequal to the second time interval; the first evaluation cycle comprises Q1 first target cycles; the first target cycle is a candidate cycle in a first candidate cycle set, at least one time length in the first time length set being used to determine the first target cycle; Q1 is a positive integer; a first parameter is dependent on a measurement gap, while a second parameter is dependent on the first candidate time interval set, a first value is linear with a product of the first parameter and the second parameter, and a result yielded by rounding the first value up to a nearest integer is equal to Q1; the DRX of the first cell group configured by the first signaling is unrelated to PTM.

In one embodiment, a problem to be solved in the present application includes: how to determine a first evaluation cycle.

In one embodiment, an advantage of the above method includes: providing good flexibility, supporting more diverse traffics, and having low implementation complexity, prolonging the battery life and ensuring the quality of communications, avoiding call drops, and enabling better compatibility with the present protocols.

Specifically, according to one aspect of the present application, the first time length set only comprises the first time length; a number of DRXs configured by the first signaling is K, where K is a positive integer greater than 1; K is used to determine a value of the second parameter; the K DRXs configured by the first signaling respectively correspond to K consecutive time windows in the first time window set.

Specifically, according to one aspect of the present application, any time window in the first time window set corresponds to one time of running of a first-type DRX timer; a name of the first-type DRX timer includes onduration.

Specifically, according to one aspect of the present application, the first time length set only comprises the first time length; any DRX cycle determined by the first time length comprises K time windows in the first time window set, K being used to determine the second parameter.

Specifically, according to one aspect of the present application, a third parameter is a real constant, and the first value is linear with a product of the first parameter, the second parameter and the third parameter.

Specifically, according to one aspect of the present application, a fourth parameter is related only to FR2 of FR1 and FR2, and the first value is linear with a product of the first parameter, the second parameter and the fourth parameter;

herein, the action of performing a first radio link quality evaluation of a first reference signal resource set within a first evaluation cycle is for FR2.

Specifically, according to one aspect of the present application, a fifth parameter is related to a type of reference signal resources in the first reference signal resource set; when the type of the reference signal resources in the first reference signal resource set is CSI-RS and a density of the reference signal resources in the first reference signal resource set satisfies a first density, the first value is linear with a product of the first parameter, the second parameter and the fifth parameter; when the type of the reference signal resources in the first reference signal resource set is SSB, the first value is unrelated to the fifth parameter; when the type of the reference signal resources in the first reference signal resource set is CSI-RS but the density of the reference signal resources in the first reference signal resource set does not satisfy the first density, the first value is unrelated to the fifth parameter.

Specifically, according to one aspect of the present application, a sixth parameter is related to types of a cell and a network that CSI-RS resources in the first reference signal resource set are for, and the first value is linear with a product of the first parameter, the second parameter and the sixth parameter; the first radio link quality evaluation is a beam failure detection.

Specifically, according to one aspect of the present application, a seventh parameter set is related to a loose measurement criterion; the first value is linear with a product of the first parameter, the second parameter and any parameter in the seventh parameter set.

Specifically, according to one aspect of the present application, an eighth parameter is related to a number of elements in the first candidate time interval set, and an eighth parameter set comprises at least the first parameter; when the number of the elements in the first candidate time interval set is greater than 1, the first value is equal to a sum of the eighth parameter and a product of the second parameter and at least the first parameter in the eighth parameter set.

Specifically, according to one aspect of the present application, the first node is a terminal of Internet of Things (IoT).

Specifically, according to one aspect of the present application, the first node is a UE.

Specifically, according to one aspect of the present application, the first node is a relay.

Specifically, according to one aspect of the present application, the first node is an access-network device.

Specifically, according to one aspect of the present application, the first node is a vehicle-mounted terminal.

Specifically, according to one aspect of the present application, the first node is an aircraft.

Specifically, according to one aspect of the present application, the first node is a cellphone.

The present application provides a first node for wireless communications, comprising:

a first receiver, receiving a first signaling, the first signaling used for configuring DRX of a first cell group; the DRX of the first cell group configured by the first signaling being for a first MAC entity;

the first receiver, listening over a PDCCH within active time of any DRX group corresponding to the first cell group;

the first receiver, performing a first radio link quality evaluation of a first reference signal resource set within a first evaluation cycle to determine whether a result of the first radio link quality evaluation is worse than a first threshold;

herein, the first signaling comprises a first time length set, the first time length set comprising at least a first time length; any time length in the first time length set is a first-type DRX cycle; a system frame number, a subframe number and the first time length set are used together to determine a first time window set; the active time of the DRX group corresponding to the first cell group comprises the first time window set; a time interval between any two adjacent time windows in the first time window set is a candidate time interval in a first candidate time interval set and the first candidate time interval set comprises at least a first time interval and a second time interval, the first time interval being unequal to the second time interval; the first evaluation cycle comprises Q1 first target cycles; the first target cycle is a candidate cycle in a first candidate cycle set, at least one time length in the first time length set being used to determine the first target cycle; Q1 is a positive integer; a first parameter is dependent on a measurement gap, while a second parameter is dependent on the first candidate time interval set, a first value is linear with a product of the first parameter and the second parameter, and a result yielded by rounding the first value up to a nearest integer is equal to Q1; the DRX of the first cell group configured by the first signaling is unrelated to PTM.

In one embodiment, compared with the prior art, the present application is advantageous in the following aspects:

supporting more flexible DRX, for instance, a non-integral DRX cycle that has equivalent performance.

supporting more diverse service types, such as XR service.

better meeting requirements for XR services.

guaranteeing the performance of signal measurement or link monitoring, for instance generation of measurement results efficiently and accurately and in a timely manner.

allowing for better compatibility with existing protocols, thus one of DRX cycles supported by the existing protocols can be used.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
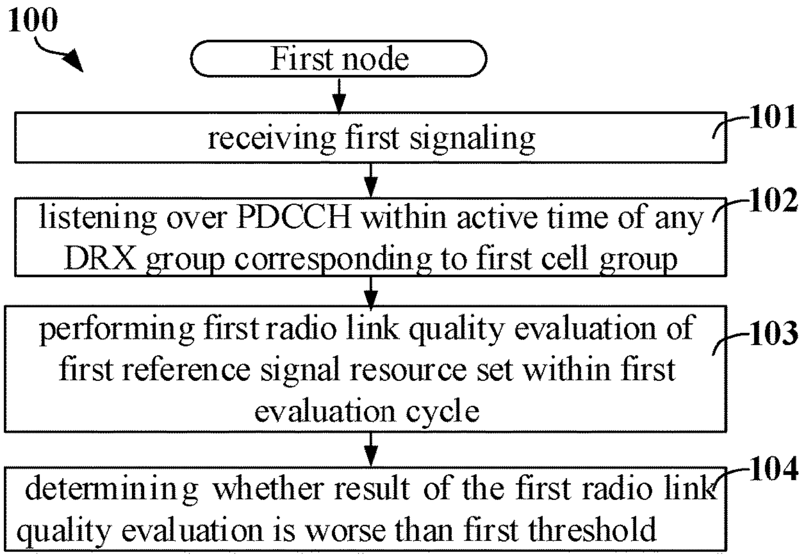
FIG. 1 illustrates a flowchart of receiving a first signaling, listening over a PDCCH within active time of any DRX group corresponding to the first cell group, and performing a first radio link quality evaluation of a first reference signal resource set within a first evaluation cycle to determine whether a result of the first radio link quality evaluation is worse than a first threshold according to one embodiment of the present application.

Embodiment 1 illustrates a flowchart of receiving a first signaling, listening over a PDCCH within active time of any DRX group corresponding to the first cell group, and performing a first radio link quality evaluation of a first reference signal resource set within a first evaluation cycle to determine whether a result of the first radio link quality evaluation is worse than a first threshold according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, the first node in the present application receives a first signaling in step 101; and listens over a PDCCH within active time of any DRX group corresponding to the first cell group in step 102; performs a first radio link quality evaluation of a first reference signal resource set within a first evaluation cycle in step 103; and determines whether a result of the first radio link quality evaluation is worse than a first threshold in step 104.

Herein, the first signaling is used for configuring DRX of a first cell group; the DRX of the first cell group configured by the first signaling being for a first MAC entity; the first signaling comprises a first time length set, the first time length set comprising at least a first time length; any time length in the first time length set is a first-type DRX cycle; a system frame number, a subframe number and the first time length set are used together to determine a first time window set; the active time of the DRX group corresponding to the first cell group comprises the first time window set; a time interval between any two adjacent time windows in the first time window set is a candidate time interval in a first candidate time interval set and the first candidate time interval set comprises at least a first time interval and a second time interval, the first time interval being unequal to the second time interval; the first evaluation cycle comprises Q1 first target cycles; the first target cycle is a candidate cycle in a first candidate cycle set, at least one time length in the first time length set being used to determine the first target cycle; Q1 is a positive integer; a first parameter is dependent on a measurement gap, while a second parameter is dependent on the first candidate time interval set, a first value is linear with a product of the first parameter and the second parameter, and a result yielded by rounding the first value up to a nearest integer is equal to Q1; the DRX of the first cell group configured by the first signaling is unrelated to PTM.

In one embodiment, the first node is a User Equipment (UE).

In one embodiment, the first node is in an RRC connected state.

In one embodiment, a serving cell refers to a cell that the UE is camped on. Performing cell search includes that the UE searches for a suitable cell for a selected Public Land Mobile Network (PLMN) or Stand-alone Non-Public Network (SNPN), selects the suitable cell to provide available services, and monitors a control channel of the suitable cell, where the whole procedure is defined to be camped on the cell; in other words, relative to this UE, the cell being camped on is seen as a serving cell of the UE. Being camped on a cell in either RRC Idle state or RRC Inactive state is advantageous in the following aspects: enabling the UE to receive system information from a PLMN or an SNPN; after registration, if a UE hopes to establish an RRC connection or resume a suspended RRC connection, the UE can perform an initial access on a control channel of the camped cell to achieve such purpose; the network can page the UE; so that the UE can receive notifications from the Earthquake and Tsunami Warning System (ETWS) and the Commercial Mobile Alert System (CMAS).

In one embodiment, for a UE in RRC connected state without being configured with carrier aggregation/dual connectivity (CA/DC), there is only one serving cell that comprises a primary cell. For a UE in RRC connected state that is configured with carrier aggregation/dual connectivity (CA/DC), a serving cell is used for indicating a cell set comprising a Special Cell (SpCell) and all secondary cells. A Primary Cell is a cell in a Master Cell Group (MCG), i.e., an MCG cell, working on the primary frequency, and the UE performs an initial connection establishment procedure or initiates a connection re-establishment on the Primary Cell. For dual connectivity (DC) operation, a special cell refers to a Primary Cell (PCell) in an MCG or a Primary SCG Cell (PSCell) in a Secondary Cell Group (SCG); otherwise, the special cell refers to a PCell.

In one embodiment, working frequency of a Secondary Cell (SCell) is secondary frequency.

In one embodiment, separate contents in information elements (IEs) are called fields.

In one embodiment, Multi-Radio Dual Connectivity (MR-DC) refers to dual connectivity with E-UTRA and an NR node, or between two NR nodes.

In one embodiment, in MR-DC, a radio access node providing a control plane connection to the core network is a master node, where the master node can be a master eNB, a master ng-eNB or a master gNB.

In one embodiment, an MCG refers to a group of serving cells associated with a master node in MR-DC, including a SpCell, and optionally, one or multiple SCells.

In one embodiment, a PCell is a SpCell of an MCG.

In one embodiment, a PSCell is a SpCell of an SCG.

In one embodiment, in MR-DC, a radio access node not providing a control plane connection to the core network but providing extra resources for the UE is a secondary node. The secondary node can be an en-gNB, a secondary ng-eNB or a secondary gNB.

In one embodiment, in MR-DC, a group of serving cells associated with a secondary node is a secondary cell group (SCG), including a SpCell and, optionally, one or multiple SCells.

In one embodiment, the first signaling is not transmitted via sidelink.

In one embodiment, the first signaling is transmitted via a link other than the sidelink.

In one embodiment, the first signaling is transmitted via a masterlink.

In one embodiment, a transmitter of the first signaling is an MCG of the first node.

In one embodiment, a transmitter of the first signaling is a PCell of the first node.

In one embodiment, a generator of the first signaling is a PCell of the first node.

In one embodiment, a transmitter of the first signaling is a serving cell of the first node.

In one embodiment, the first signaling is an RRC signaling.

In one embodiment, the first signaling is or comprises a MAC CE.

In one embodiment, the first signaling comprises a MAC CE and an RRC signaling.

In one embodiment, the first signaling comprises a RRCReconfiguration.

In one embodiment, the first signaling comprises a RRC-ConnectionReconfiguration.

In one embodiment, the first signaling is for one of DRX-Config2 or DRX-Config.

In one embodiment, the first signaling comprises at least partial fields in CellGroupConfig.

In one embodiment, the first signaling comprises at least partial fields in MAC-CellGroupConfig.

In one embodiment, the first signaling is one of DRX-ConfigSecondaryGroup or DRX-Config.

In one embodiment, the first signaling is or comprises a DRX-ConfigExt.

In one embodiment, the first signaling is or comprises a DRX-ConfigXR.

In one embodiment, the first signaling is or comprises a DRX-ConfigExt2.

In one embodiment, the first signaling is or comprises a DRX-ConfigExt3.

In one embodiment, the first signaling is or comprises a first field, where a name of the first field includes "DRX-Config".

In one subembodiment, the first field is not a DRX-ConfigSecondaryGroup.

In one subembodiment, the first signaling comprises DRX-Config.

In one embodiment, the first signaling does not comprise DRX-Config.

In one embodiment, the first signaling is or comprises a first field, where a name of the first field includes "DRX-Config".

In one subembodiment, the first field is not DRX-Config.

In one subembodiment, the first signaling comprises a DRX-ConfigSecondaryGroup.

In one embodiment, the first signaling only comprise one of a DRX-ConfigSecondaryGroup or DRX-Config.

In one embodiment, the first signaling is transmitted in a unicast way.

In one embodiment, the first signaling is transmitted using a dedicated control channel (DCCH).

In one embodiment, the first cell group is either an MCG or an SCG.

In one embodiment, the DRX-ConfigSecondaryGroup is only for an SCG.

In one embodiment, the DRX-Config is only for an MCG.

In one embodiment, the sentence that the first signaling is used for configuring DRX of a first cell group includes a meaning that: the first signaling is for the first cell group.

In one embodiment, the sentence that the first signaling is used for configuring DRX of a first cell group includes a meaning that: the first signaling configures DRX groups corresponding to the first cell group, of which each DRX group comprises a group of DRX parameters.

In one embodiment, the sentence that the first signaling is used for configuring DRX of a first cell group includes a meaning that: the first signaling comprises at least one parameter of DRX of the first cell group.

In one embodiment, the sentence that the first signaling is used for configuring DRX of a first cell group includes a meaning that: the first signaling is used for configuring DRX of the first cell group.

In one embodiment, DRX of the first cell group is or belongs to a DRX group corresponding to the first cell group.

In one embodiment, DRX of the first cell group is or belongs to a DRX group associated with the first cell group.

In one embodiment, DRX of the first cell group is or belongs to a DRX group of the first cell group.

In one embodiment, the action of listening over a physical downlink control channel (PDCCH) includes: performing blind detection on resources occupied by the PDCCH.

In one embodiment, the action of listening over a physical downlink control channel (PDCCH) includes: performing baseband processing on resources occupied by the PDCCH for obtaining bit block(s).

In one embodiment, the action of listening over a physical downlink control channel (PDCCH) includes: performing demodulation on resources occupied by the PDCCH.

In one embodiment, the action of listening over a physical downlink control channel (PDCCH) includes: performing blind decoding of bit block(s) carried by the PDCCH.

In one embodiment, the action of listening over a physical downlink control channel (PDCCH) includes: performing de-scrambling of bit block(s) on the PDCCH.

In one embodiment, the action of listening over a physical downlink control channel (PDCCH) includes: performing CRC of bit block(s) on the PDCCH.

In one embodiment, the action of listening over a physical downlink control channel (PDCCH) includes: receiving downlink control information (DCI) on the PDCCH.

In one embodiment, the action of listening over a physical downlink control channel (PDCCH) includes: receiving downlink control information (DCI) on the PDCCH which is scrambled by a C-RNTI of the first node.

In one embodiment, the action of listening over a physical downlink control channel (PDCCH) includes: receiving downlink control information (DCI) on the PDCCH which is for the first node.

In one embodiment, the first signaling comprises a first time length.

In one embodiment, the first time length set comprises a first time length.

In one embodiment, a name of a field in the first signaling for indicating the first time length includes "cycle".

In one embodiment, a name of a field in the first signaling for indicating the first time length includes "drx".

In one embodiment, a candidate value of the first time length is 50 ms.

In one embodiment, the first time length is measured in a time unit of milliseconds.

In one embodiment, the first time length is a length of a DRX cycle.

In one embodiment, the first time length is a length of a DRX cycle indicated by the first signaling.

In one embodiment, the DRX in the present application includes eDRX.

In one embodiment, the first time length is a length of a long DRX cycle.

In one embodiment, the sentence of the DRX of the first cell group configured by the first signaling being for a first MAC entity includes a meaning that: the first MAC entity is a MAC entity for the first cell group.

In one embodiment, the first cell group has one and only MAC entity.

In one embodiment, the sentence of the DRX of the first cell group configured by the first signaling being for a first MAC entity includes a meaning that: the DRX of the first cell group is for the first MAC entity.

In one embodiment, the sentence of the DRX of the first cell group configured by the first signaling being for a first MAC entity includes a meaning that: DRX configured by the first signaling is executed by the first MAC entity.

In one embodiment, the sentence of the DRX of the first cell group configured by the first signaling being for a first MAC entity includes a meaning that: the first MAC entity executes DRX configured by the first signaling.

In one embodiment, the sentence of the DRX of the first cell group configured by the first signaling being for a first MAC entity includes a meaning that: the first MAC entity processes the active time of a DRX group corresponding to the first cell group.

In one embodiment, the sentence of the DRX of the first cell group configured by the first signaling being for a first MAC entity means or includes a meaning that: the first signaling is for a cell group, that is, the first cell group.

In one embodiment, the system frame number is an SFN.

In one embodiment, the subframe number is a subframe number.

In one embodiment, DRX configured by the first signaling is a long DRX.

In one embodiment, the DRX of the first cell group configured by the first signaling is a long DRX.

In one embodiment, time windows comprised in the first time window set are orthogonal in time domain.

In one embodiment, any two time windows comprised in the first time window set are orthogonal in time domain.

In one embodiment, any two time windows comprised in the first time window set are non-overlapped in time domain.

In one embodiment, any two time windows comprised in the first time window set are non-consecutive in time domain.

In one embodiment, the first signaling is for a DRX group.

In one embodiment, the first signaling is for multiple DRX groups of the first cell group.

In one embodiment, the first signaling is for each DRX group of the first cell group.

In one embodiment, a DRX group of the first cell group is a DRX group corresponding to the first cell group.

In one embodiment, a length of any time window in the first time window set is finite.

In one embodiment, time windows comprised in the first time window set are finite.

In one embodiment, time windows comprised in the first time window set can be infinite, depending on the power and/or RRC state and/or service requirements of the first node.

In one embodiment, time windows comprised in the first time window set are within a same DRX cycle.

In one embodiment, time windows comprised in the first time window set are within different DRX cycles.

In one embodiment, time windows comprised in the first time window set are within multiple or all DRX cycles.

In one embodiment, the DRX cycle is a long DRX cycle.

In one embodiment, the first signaling comprises a length of any time window in the first time window set.

In one embodiment, all time windows in the first time window set are of equal lengths.

In one embodiment, the first time window set comprises two time windows of unequal lengths.

In one embodiment, the first time window set comprises a first time window and a second time window.

In one embodiment, the first time window and the second time window are two adjacent time windows.

In one embodiment, the first time window and the second time window are two non-adjacent time windows.

In one embodiment, the first time window and the second time window are any two time windows.

In one embodiment, the first time window and the second time window are two time windows belonging to a same DRX cycle.

In one embodiment, the first time window is an earliest time window that belongs to a DRX cycle in the first time window set.

In one embodiment, a first offset is a time interval between the first time window and the second time window.

In one embodiment, the first signaling comprises a first offset set.

In one embodiment, a DRX group comprises one DRX sub-group.

In one embodiment, a DRX group comprises K DRX sub-groups, K being greater than 1.

In one embodiment, the first signaling comprises a first time length set, with the first time length being one among the first time length set.

In one embodiment, the first time length set comprises at least 2 time lengths.

In one subembodiment, the first time length set comprises K time lengths.

In one subembodiment, the first time length set comprises K−1 time length(s).

In one subembodiment, the first time length set comprises K+1 time lengths.

In one subembodiment, the first time length is for a first offset in the first offset set.

In one subembodiment, each time length in the first time length set other than the first time length is for an offset other than a first offset in the first offset set.

In one subembodiment, there exists a one-to-one correspondence relationship between time lengths in the first time length set and offsets in the first offset set.

In one subembodiment, K is a positive integer greater than 1.

In one subembodiment, a candidate value of K is 2.

In one embodiment, the action of listening over a PDCCH within active time of any DRX group corresponding to the first cell group comprises: receiving a first specific DCI in the first specific time window, the first specific DCI being downlink control information, and a DCI format of the first specific DCI being a first format.

In one subembodiment, the first format is one of 0_0, 0_1, 0_2, 1_0, 1_1 or 1_2.

In one subembodiment, the first format is one of 2_0, 2_1, 2_2, 2_3, 2_4 or 2_5.

In one subembodiment, the first format is one of 3_0 or 3_1.

In one subembodiment, the first format is one of 2_7, 2_8 or 2_9.

In one subembodiment, the first format is not 2_6.

In one subembodiment, a C-RNTI of the first node is used for scrambling the first specific DCI.

In one embodiment, the first time window set is for one DRX cycle.

In one embodiment, the first time window set is for multiple DRX cycles.

In one embodiment, the first signaling comprises a first offset set.

In one embodiment, a field in the first signaling, of which the name includes XR, indicates the first offset set.

In one embodiment, any offset comprised in the first offset set is a time-domain offset.

In one embodiment, any offset comprised in the first offset set is measured in millisecond (ms).

In one embodiment, any offset comprised in the first offset set is measured in slot.

In one embodiment, any offset comprised in the first offset set is measured in subframe.

In one embodiment, any offset comprised in the first offset set is measured in frame.

In one embodiment, any offset comprised in the first offset set is measured in symbol.

In one embodiment, any offset comprised in the first offset set represents an integral number of time unit(s).

In one embodiment, a first offset comprised in the first offset set is a real number of time unit(s) as well as a non-integral number of time unit(s).

In one embodiment, any offset comprised in the first offset set is a scalar.

In one embodiment, the first offset set comprises K offset(s).

In one subembodiment, K is equal to 1.

In one subembodiment, K is equal to 2.

In one subembodiment, K is equal to 3.

In one subembodiment, a value of K is greater than 3.

In one subembodiment, a value of K is no greater than 16.

In one subembodiment, a value of K is no greater than 64.

In one subembodiment, a value of K is related to a number of QoS flows of the first node.

In one embodiment, the phrase of the DRX of the first cell group configured by the first signaling being for a first MAC entity includes a meaning that: the DRX configured by the first signaling is only valid for a first MAC entity, the first MAC entity corresponding to the first cell group.

In one embodiment, the phrase of the DRX of the first cell group configured by the first signaling being for a first MAC entity includes a meaning that: the first MAC entity is a MAC entity corresponding to the first cell group, the first cell group having only one corresponding MAC entity.

In one embodiment, the phrase of the DRX of the first cell group configured by the first signaling being for a first MAC entity includes a meaning that: the DRX configured by the first signaling is for a DRX group, the DRX group being for the first cell group, and the first MAC entity is a MAC entity corresponding to the first cell group, the first cell group having only one corresponding MAC entity.

In one embodiment, the phrase of the DRX of the first cell group configured by the first signaling being for a first MAC entity includes a meaning that: the DRX configured by the first signaling is for a DRX group, where a MAC entity that the DRX group are for is the first MAC entity.

In one embodiment, the phrase of the DRX of the first cell group configured by the first signaling being for a first MAC entity includes a meaning that: the DRX configured by the first signaling is for a DRX group, where a MAC entity to which the DRX group corresponds is the first MAC entity.

In one embodiment, the phrase of the DRX of the first cell group configured by the first signaling being for a first MAC entity includes a meaning that: the DRX of the first MAC entity is configured by the first signaling.

In one embodiment, a DRX group is in active time, which means that a node is required to listen over a PDCCH.

In one embodiment, a DRX group is in active time, which means that a node is awake.

In one embodiment, the phrase that any time length in the first time length set is a first-type DRX cycle includes a meaning that: any time length in the first time length set is a DRX cycle in a DRX configuration, where the DRX configuration is a long DRX.

In one embodiment, the phrase that any time length in the first time length set is a first-type DRX cycle includes a meaning that: when the first node is configured with one long DRX cycle, the first time length set only comprises the first time length; when the first node is configured with K1 long DRX cycles, the first time length set comprises K1 time lengths, K1 being a positive integer greater than 1.

In one embodiment, a candidate value of the first time length includes 16 ms.

In one embodiment, a candidate value of the first time length includes 17 ms.

In one embodiment, a candidate value of the first time length includes 50 ms.

In one embodiment, the first time length set at least comprises 16 ms and 17 ms.

In one embodiment, the sentence that the active time of any DRX group corresponding to the first cell group comprises the first time window set includes a meaning that: any time window in the first time window set belongs to the active time of the first MAC entity.

In one embodiment, the sentence that the active time of any DRX group corresponding to the first cell group comprises the first time window set includes a meaning that: the active time of the first MAC entity comprises any time window in the first time window set.

In one embodiment, the sentence that the active time of any DRX group corresponding to the first cell group comprises the first time window set includes a meaning that: within any time window in the first time window set, the first MAC entity is in its active time.

In one embodiment, the sentence that the active time of any DRX group corresponding to the first cell group comprises the first time window set includes a meaning that: within any time window in the first time window set, each DRX group corresponding to a cell group corresponding to the first MAC entity is in its active time.

In one embodiment, the sentence that the active time of any DRX group corresponding to the first cell group comprises the first time window set includes a meaning that: each time window comprised by the first time window set belongs to the active time of a DRX group corresponding to the first cell group.

In one embodiment, the sentence that the active time of any DRX group corresponding to the first cell group comprises the first time window set includes a meaning that: each time window comprised by the first time window set belongs to the active time of multiple DRX groups corresponding to the first cell group.

In one embodiment, the sentence that the active time of any DRX group corresponding to the first cell group comprises the first time window set includes a meaning that: the first time window set comprises at least one time window that belongs to the active time of a DRX group corresponding to the first cell group; the first time window set comprises at least one time window that belongs to the active time of a DRX group corresponding to the first cell group other than the DRX group corresponding to the first cell group.

In one embodiment, the sentence that the active time of any DRX group corresponding to the first cell group comprises the first time window set includes a meaning that: an i-th time window subset comprised by the first time window set belongs to the active time of an i-th DRX group of the first cell group, where the i-th time window subset is not empty, i being a positive integer.

In one embodiment, the sentence that the active time of the DRX group corresponding to the first cell group comprises the first time window set includes a meaning that: any time window in the first time window set belongs to the active time of the first MAC entity.

In one embodiment, the sentence that the active time of the DRX group corresponding to the first cell group comprises the first time window set includes a meaning that: the active time of the first MAC entity comprises any time window in the first time window set.

In one embodiment, the sentence that the active time of the DRX group corresponding to the first cell group comprises the first time window set includes a meaning that: within any time window in the first time window set, the first MAC entity is in its active time.

In one embodiment, the sentence that the active time of the DRX group corresponding to the first cell group comprises the first time window set includes a meaning that: within any time window in the first time window set, each DRX group corresponding to a cell group corresponding to the first MAC entity is in its active time.

In one embodiment, the sentence that the active time of the DRX group corresponding to the first cell group comprises the first time window set includes a meaning that:

each time window comprised by the first time window set belongs to the active time of a DRX group corresponding to the first cell group.

In one embodiment, the sentence that the active time of the DRX group corresponding to the first cell group comprises the first time window set includes a meaning that: each time window comprised by the first time window set belongs to the active time of multiple DRX groups corresponding to the first cell group.

In one embodiment, the sentence that the active time of the DRX group corresponding to the first cell group comprises the first time window set includes a meaning that: the first time window set comprises at least one time window that belongs to the active time of a DRX group corresponding to the first cell group; the first time window set comprises at least one time window that belongs to the active time of a DRX group corresponding to the first cell group other than the DRX group corresponding to the first cell group.

In one embodiment, the sentence that the active time of the DRX group corresponding to the first cell group comprises the first time window set includes a meaning that: an i-th time window subset comprised by the first time window set belongs to the active time of an i-th DRX group of the first cell group, where the i-th time window subset is not empty, i being a positive integer.

In one embodiment, the sentence that the active time of the DRX group corresponding to the first cell group comprises the first time window set includes a meaning that: each time window comprised by the first time window set belongs to the active time of a DRX group of the first cell group.

In one embodiment, any two time windows in the first time window set are in a chronological order in time domain.

In one embodiment, the any two adjacent time windows in the first time window set are two time windows of which start times are most approximate to each other.

In one embodiment, the any two adjacent time windows in the first time window set are two time windows of which end times are most approximate to each other.

In one embodiment, the any two adjacent time windows in the first time window set are respectively any time window and another time window which starts at a most approximate time to that of the any time window.

In one embodiment, the any two adjacent time windows in the first time window set are respectively any time window and another time window which ends at a most approximate time to that of the any time window.

In one embodiment, any time window in the first time window set has at least one neighboring time window.

In one embodiment, any time window in the first time window set has one or two neighboring time windows.

In one embodiment, the first time window set comprises at least 2 time windows.

Typically, the first time window set comprises at least 3 time windows.

In one embodiment, the any two adjacent time windows in the first time window set are two time windows which are most close to each other in time domain.

In one embodiment, the any two adjacent time windows in the first time window set are two successive time windows which are most close to each other in time domain.

In one embodiment, the first candidate time interval set comprises at least one time interval.

In one embodiment, the first offset set comprises K2 offset(s), when K2 is greater than 1, the first candidate time interval set comprises at least two time intervals.

In one embodiment, a time interval between two adjacent time windows in the first time window set is the first time interval, and, a time interval between another two adjacent time windows in the first time window set is the second time interval.

In one subembodiment, the first time window set comprises at least 3 time windows.

In one subembodiment, the two adjacent time windows in the first time window set are different from the other two adjacent time windows in the first time window set.

In one subembodiment, at least one of the two adjacent time windows in the first time window set does not belong to the other two adjacent time windows in the first time window set.

In one embodiment, there is at least one time window in the first time window set being comprised within any time of a first time length.

Typically, the first time interval is 16 ms, and the second time interval is 17 ms.

Typically, the first time interval is 17 ms, and the second time interval is 16 ms. In one embodiment, a target DRX cycle is one of multiple parameters for determining the first evaluation cycle.

In one embodiment, when a time interval between any two adjacent time windows in the first time window set and a time interval between any other two adjacent time windows in the first time window set are mutually equal, the first time length set only comprises one time length, that is, the first time length.

In one embodiment, when a time interval set made up of time intervals between mutually adjacent time windows in the first time window set comprise at least two time intervals, the first time length set comprises more than one time length.

In one embodiment, when a time interval set made up of time intervals between mutually adjacent time windows in the first time window set comprise at least two time intervals, the first time length set only comprises one time length.

In one embodiment, the sentence that a time interval between any two adjacent time windows in the first time window set is a candidate time interval in a first candidate time interval set and the first candidate time interval set comprises at least a first time interval and a second time interval means that: there are two adjacent time windows in the first time window set between which a time interval is the first time interval, and there are two adjacent time windows in the first time window set between which a time interval is the second time interval.

In one embodiment, the first time interval is unequal to the second time interval.

In one embodiment, the meaning of the phrase that DRX configured by the first signaling is unrelated to PTM is or includes: the DRX configured by the first signaling is for PTP.

In one embodiment, the meaning of the phrase that DRX configured by the first signaling is unrelated to PTM is or includes: the DRX configured by the first signaling is for unicast.

In one embodiment, the meaning of the phrase that DRX configured by the first signaling is unrelated to PTM is or includes: a name of a timer related to the DRX configured by the first signaling does not include PTM.

In one embodiment, the meaning of the phrase that DRX configured by the first signaling is unrelated to PTM is or includes: the DRX configured by the first signaling is unrelated to a G-RNTI.

In one embodiment, the meaning of the phrase that DRX configured by the first signaling is unrelated to PTM is or includes: the DRX configured by the first signaling is for a cell or a cell group rather than an RNTI.

In one embodiment, the action of performing a first radio link quality evaluation is or includes radio link monitoring (RLM).

In one embodiment, the action of performing a first radio link quality evaluation is or includes radio link recovery.

In one embodiment, the action of performing a first radio link quality evaluation is or includes beam failure detection.

In one embodiment, the action of performing a first radio link quality evaluation is or includes link recovery.

In one embodiment, the action of performing a first radio link quality evaluation is or includes link recovery of a specific Transmission-Reception Point (TRP).

In one embodiment, the action of performing a first radio link quality evaluation is or includes a measurement of a first reference signal resource set, the first reference signal resource set comprising one reference signal resource.

In one embodiment, the first reference signal resource set comprises SSB resources.

In one embodiment, the first reference signal resource set comprises CSI-RS resources.

In one embodiment, the action of performing a first radio link quality evaluation is or includes: performing a measurement of a first reference signal resource set, and determining a link quality according to whether a measurement result exceeds or fails to meet a specific threshold.

In one embodiment, the action of performing a first radio link quality evaluation is or includes: performing a measurement of a first reference signal resource set, and determining whether to indicate to higher layers above a PHY layer according to whether a measurement result exceeds or fails to meet a specific threshold.

In one embodiment, the action of performing a first radio link quality evaluation is or includes: performing a measurement of a first reference signal resource set, and determining whether to indicate to higher layers above a PHY layer according to whether a measurement result exceeds or fails to meet a specific threshold.

In one embodiment, the action of performing a first radio link quality evaluation is or includes: performing an evaluation for a first reference signal resource set.

In one embodiment, the action of performing a first radio link quality evaluation is or includes: each time when a radio link quality being evaluated is worse than a first threshold, a PHY layer of the first node reports a first-type indication to higher layers of the first node.

In one embodiment, the action of performing a first radio link quality evaluation is or includes: as a response to the higher layers of the first node receiving Q2 first-type indications successively, starting a first timer, Q2 being a positive integer.

In one embodiment, as a response to the first timer being expired, a radio link failure is detected.

In one embodiment, the first threshold is determined by the first node based on algorithm.

In one embodiment, the first threshold is indicated by the network.

In one embodiment, the first threshold is pre-configured.

In one embodiment, the Q2 is indicated by the network.

In one embodiment, the higher layers of the first node are layers above a PHY layer of the first node.

In one embodiment, the higher layers of the first node include a MAC layer.

In one embodiment, the higher layers of the first node include an RRC layer.

In one embodiment, the first reference signal resource set is configured by the first cell group.

In one embodiment, the first reference signal resource set is configured by the network.

In one embodiment, the first-type indication is "out-of-sync".

In one embodiment, the first-type indication is a beam failure instance sub-indication.

In one embodiment, the action of performing a first radio link quality evaluation is or includes: as a response to the higher layers of the first node receiving Q2 first-type indications successively, triggering a beam failure recovery.

In one embodiment, the first radio link quality evaluation is performed periodically.

In one embodiment, the first radio link quality evaluation is performed aperiodically.

In one embodiment, whether the first radio link quality evaluation is periodically performed is configured by the network.

In one embodiment, whether the first radio link quality evaluation is periodically performed is determined by the first node according to its internal algorithm.

In one embodiment, the time for the action of performing a first radio link quality evaluation refers to an evaluation period.

In one embodiment, the first evaluation cycle is a shortest period for performing the first radio link quality evaluation.

In one embodiment, the shortest evaluation period for performing the first radio link quality evaluation cannot be shorter than the first evaluation cycle.

In one embodiment, the shorter the evaluation period, the easier it will be to detect a rapid change in the quality of a radio link, however, the evaluation result will see a large fluctuation and the accuracy of evaluation may be reduced, so the accuracy and speed of evaluation shall be taken into full consideration. Since DRX will have a direct influence on the link quality evaluation, a further balance between the accuracy and the speed of evaluation shall be reached for achieving more complex and flexible DRX.

In one embodiment, the first time window set is unrelated to a running state of a DRX retransmission timer of the first MAC entity; the DRX retransmission timer of the first MAC entity is used for controlling a longest period of waiting for retransmission or waiting for a grant for retransmission.

In one subembodiment, the sentence that the first time window set is unrelated to a running state of a DRX retransmission timer of the first MAC entity includes a meaning that: within time windows of the first time window set, the DRX retransmission timer of the first MAC entity can be either in a running state or a suspended state.

In one subembodiment, the sentence that the first time window set is unrelated to a running state of a DRX retransmission timer of the first MAC entity includes a meaning that: within some time windows of the first time window set, the DRX retransmission timer of the first MAC entity is in a running state; while within other time windows of the first time window set, the DRX retransmission timer of the first MAC entity is in a suspended state.

In one subembodiment, the sentence that the first time window set is unrelated to a running state of a DRX retransmission timer of the first MAC entity includes a meaning that: a running state of the DRX retransmission timer of the first MAC entity is not used to determine any time window in the first time window set.

In one subembodiment, the DRX retransmission timer of the first MAC entity is a DRX retransmission timer of a DRX group corresponding to the first cell group.

In one subembodiment, the DRX retransmission timer of the first MAC entity is a DRX retransmission timer corresponding to any HARQ process of the first MAC entity.

In one subembodiment, the DRX retransmission timer of the first MAC entity includes a timer for uplink or downlink retransmission.

In one subembodiment, a name of the DRX retransmission timer of the first MAC entity includes drx and Retransmission.

In one subembodiment, the DRX retransmission timer of the first MAC entity includes a drx-RetransmissionTimerDL.

In one subembodiment, the DRX retransmission timer of the first MAC entity includes a drx-RetransmissionTimerUL.

In one subembodiment, the DRX retransmission timer of the first MAC entity is in a suspended state in at least partial time of time windows comprised in the first time window set.

In one embodiment, the first time window set is unrelated to a running state of a DRX Inactive timer of the first MAC entity.

In one embodiment, the DRX Inactive timer of the first MAC entity is a drx-inactivitytimer.

In one embodiment, a name of the DRX Inactive timer of the first MAC entity includes inactivity.

In one embodiment, when a DRX group corresponding to the first cell group is in an active time, and when the physical downlink control channel (PDCCH) indicates a new transmission of a cell of a DRX group corresponding to the first cell group, the DRX Inactive timer of the first MAC entity is started or restarted.

In one embodiment, the active time of a DRX group corresponding to the first cell group comprises the time during which the DRX Inactive timer of the first MAC entity is running.

In one embodiment, a function of a DRX Inactive timer is that the DRX Inactive timer will or will only leave from its active state after going through a period of inactivity, which helps prevent the timer from missing continuous data.

In one embodiment, the first time length set only comprises one time length, that is, the first time length.

In one embodiment, the first time length set only comprises one element, that is, the first time length.

In one embodiment, a number of DRXs configured by the first signaling is K, where K is a positive integer greater than 1.

In one embodiment, K is used to determine a value of the second parameter.

In one embodiment, the K DRXs configured by the first signaling respectively correspond to K consecutive time windows in the first time window set.

In one embodiment, the meaning of the sentence that a number of DRXs configured by the first signaling is K is or includes: the first signaling comprises a DRX configuration list, the DRX configuration list comprising K DRX configurations, where each of the K DRX configurations comprises a DRX cycle.

In one embodiment, the meaning of the sentence that a number of DRXs configured by the first signaling is K is or includes: the first signaling comprises K DRX configurations, where a cycle of each DRX in the K DRX configurations belongs to the first time length set, the first time length set comprising K time lengths.

In one embodiment, the meaning of the sentence that a number of DRXs configured by the first signaling is K is or includes: the first signaling comprises K DRX groups of the first cell group, where the DRXs configured by the first signaling respectively belong to the K DRX groups of the first cell group.

In one embodiment, any time window in the first time window set corresponds to one time of running of a first-type DRX timer; a name of the first-type DRX timer includes onduration.

In one embodiment, the first-type DRX timer is a DRX onduration timer.

In one embodiment, each time of running of the first-type DRX timer is a start of a DRX cycle.

In one embodiment, the active time of the first MAC entity comprises running time of the first-type DRX timer.

In one embodiment, the K DRX configurations corresponds to K first-type DRX timers.

In one subembodiment, a time interval between two successive runnings of any first-type timer among the K first-type DRX timers corresponding to the K DRX configurations is a DRX cycle.

In one subembodiment, of each time interval between two successive runnings of any first-type timer among the K first-type DRX timers corresponding to the K DRX configurations a shortest time interval is a DRX cycle.

In one embodiment, the K first-type DRX timers corresponding to the K DRX configurations belong to a same DRX group.

In one embodiment, the K first-type DRX timers corresponding to the K DRX configurations are all for the first MAC entity.

In one embodiment, the K first-type DRX timers corresponding to the K DRX configurations are all for the first cell group.

In one embodiment, the K DRXs configured by the first signaling belong to a same DRX group.

In one embodiment, the K DRXs configured by the first signaling respectively belong to K DRX groups.

In one embodiment, any serving cell can belong to the K DRX groups at the same time.

In one embodiment, any serving cell can belong to at least two of the K DRX groups at the same time.

In one embodiment, the first signaling configures K DRX group(s) for the first cell group, where each of the K DRX group(s) comprises one DRX cycle that belongs to the first time length set; correspondingly, the first time length set comprises K time length(s).

In one embodiment, any DRX group of the K DRX group(s) for the first cell group configured by the first signaling comprises a said first-type DRX timer; a time interval between two successive runnings of a first-type DRX timer comprised by any DRX group among the K DRX groups for the first cell group configured by the first signaling is a DRX cycle.

In one embodiment, any DRX group of the K DRX groups for the first cell group configured by the first signaling comprises a said first-type DRX timer; of each time interval between two successive runnings of a first-type DRX timer comprised by any DRX group among the K DRX groups for the first cell group configured by the first signaling a shortest time interval is a DRX cycle of the any DRX group among the K DRX groups of the first cell group.

In one embodiment, the first time window set comprises at least K time windows, and the K DRXs configured by the first signaling respectively correspond to any K consecutive time windows comprised in the first time window set.

In one embodiment, the first time window set comprises at least K time windows, and the K DRXs configured by the first signaling are respectively used to determine start times and durations of any K consecutive time windows comprised in the first time window set.

In one embodiment, the first time window set comprises at least K time windows, and any K consecutive time windows comprised in the first time window set respectively correspond to single runnings of K DRX onduration timers; the K DRX onduration timers respectively belong to the K DRXs configured by the first signaling.

In one embodiment, any DRX cycle determined by the first time length comprises K time window(s) in the first time window set.

In one embodiment, any K consecutive time windows in the first time window set belong to one DRX cycle determined by the first time length.

In one embodiment, the sentence that a system frame number, a subframe number and the first time length set being used together to determine a first time window set includes a meaning that the system frame number, the subframe number and the first time length set are used together to determine a first time window in the first time window set; the first offset set comprises a second offset, the second offset being an offset of the second time window relative to the first time window in time; the second time window belongs to the first time window set, the second offset not being 0; a first time window corresponds to a running duration of an onduration timer of DRX of the first MAC entity, where the onduration timer of DRX of the first MAC entity only runs at the start of a DRX cycle.

In one embodiment, among the K time windows in the first time window set that are comprised by any DRX cycle determined by the first time length only one time window corresponds to a running of a first-type DRX timer, where a name of the first-type DRX timer includes Onduration; the first-type DRX timer is not running within any time window other than the only one time window among the K time windows in the first time window set that are comprised by any DRX cycle determined by the first time length.

In one embodiment, running time of a second-type DRX timer corresponds to a time window other than the only one time window among the K time windows in the first time window set that are comprised by any DRX cycle determined by the first time length.

In one embodiment, any time window other than the only one time window among the K time windows in the first time window set that are comprised by any DRX cycle determined by the first time length does not correspond to the running of any DRX timer.

In one embodiment, a target DRX cycle is used to determine the first evaluation cycle.

In one embodiment, the phrase that a target DRX cycle is used to determine the first evaluation cycle includes a meaning that: the target DRX cycle and a first coefficient are used together to determine the first evaluation cycle, when a time interval between any two adjacent time windows in the first time window set is equal to that between any other two adjacent time windows in the first time window set, the first coefficient is equal to 1; when a time interval between any two adjacent time windows in the first time window set is a candidate time interval in a first candidate time interval set and the first candidate time interval set comprises at least a first time interval and a second time interval, the first coefficient is unequal to 1.

In one embodiment, the first candidate time interval set also comprises at least one time interval other than the first time interval and the second time interval.

In one embodiment, the first candidate time interval set only comprises the first time interval and the second time interval.

In one embodiment, the first candidate time interval set is configurable.

In one embodiment, when the first coefficient is unequal to 1, the first coefficient is equal to K, where K is a number of elements in the first time length set.

In one embodiment, when the first coefficient is unequal to 1, the first coefficient is equal to 1/K, where K is a number of elements in the first time length set.

In one embodiment, when the first coefficient is unequal to 1, the first coefficient is equal to K+1, where K is a number of elements in the first time length set.

In one embodiment, when the first coefficient is unequal to 1, the first coefficient is equal to 1/(K+1), where K is a number of elements in the first time length set.

In one embodiment, when the first coefficient is unequal to 1, the first coefficient is equal to K, where K is a number of DRX groups corresponding to the first cell group.

In one embodiment, when the first coefficient is unequal to 1, the first coefficient is equal to 1/K, where K is a number of DRX groups corresponding to the first cell group.

In one embodiment, when the first coefficient is unequal to 1, the first coefficient is equal to K, where K is a number of DRX configurations of the first MAC entity configured by the first signaling.

In one embodiment, when the first coefficient is unequal to 1, the first coefficient is equal to 1/K, where K is a number of DRX configurations of the first MAC entity configured by the first signaling.

In one embodiment, when the first coefficient is unequal to 1, the first coefficient is equal to K+1, where K is a number of DRX groups corresponding to the first cell group.

In one embodiment, when the first coefficient is unequal to 1, the first coefficient is equal to 1/(K+1), where K is a number of DRX groups corresponding to the first cell group.

In one embodiment, when the first coefficient is unequal to 1, the first coefficient is equal to K+1, where K is a number of DRX configurations of the first MAC entity configured by the first signaling.

In one embodiment, when the first coefficient is unequal to 1, the first coefficient is equal to 1/(K+1), where K is a number of DRX configurations of the first MAC entity configured by the first signaling.

In one embodiment, a name of the first evaluation cycle includes Tevaluate.

In one embodiment, the first evaluation cycle is a $T_{evaluate}$.

In one embodiment, the first evaluation cycle is a $T_{evaluate}$.

In one embodiment, the first evaluation cycle is a $T_{Evaluate\_BFD\_SSB}$.

In one embodiment, the first evaluation cycle is a $T_{Evaluate\_BFD\_CSI\text{-}RS}$.

In one embodiment, the first evaluation cycle is a $T_{Evaluate\_CBD}$.

In one embodiment, the first evaluation cycle is a $T_{Evaluate\_CBD\_SSB}$.

In one embodiment, the first evaluation cycle is a $T_{Evaluate\_CBD\_CSI\text{-}RS}$.

In one embodiment, the first evaluation cycle is a $T_{Evaluate\_BFD\_SSB}$.

In one embodiment, the first evaluation cycle is a $T_{Evaluate\_CBD\_CSI\text{-}RS}$.

In one embodiment, the first evaluation cycle is a $T_{Evaluate\_out\_SSB}$.

In one embodiment, the first evaluation cycle is a $T_{Evaluate\_in\_SSB}$.

In one embodiment, the first evaluation cycle is a $T_{Evaluate\_in\_CSI\text{-}RS}$.

In one embodiment, the first evaluation cycle is a $T_{Evaluate\_out\_CSI\text{-}RS}$.

In one embodiment, the first node is not configured to monitor a DCI with CRC scrambled by PS-RNTI (DCP).

In one embodiment, the first node is configured to monitor a DCP, and the DCP indicates a start of the first-type DRX timer.

In one embodiment, the first node is configured to monitor a DCP, and the DCP indicates a start of a drx-onDurationTimer.

In one embodiment, the method proposed by the present application is applicable to Clear Channel Evaluation (CCA).

In one embodiment, the first radio link quality evaluation includes cell identification.

In one subembodiment, the first evaluation cycle is a period of cell identification.

In one embodiment, the first radio link quality evaluation includes primary synchronization signal (PSS)/secondary synchronization signal (SSS) detection.

In one subembodiment, the first evaluation cycle is a period of PSS/SSS detection.

In one embodiment, the first radio link quality evaluation includes intra-frequency measurements.

In one subembodiment, the first evaluation cycle is a Measurement period for intra-frequency measurements.

In one embodiment, the first radio link quality evaluation includes inter-frequency measurements.

In one subembodiment, the first evaluation cycle is a Measurement period for inter-frequency measurements.

In one embodiment, the first radio link quality evaluation includes L1 RSRP measurement.

In one subembodiment, the first evaluation cycle is a period for L1 RSRP report.

In one embodiment, the first radio link quality evaluation includes sounding reference signal (SRS)-RSRP measurement.

In one subembodiment, the first evaluation cycle is a period for SRS-RSRP measurement.

In one embodiment, the first radio link quality evaluation includes sidelink synchronization signal evaluation.

In one subembodiment, the first evaluation cycle is a period for sidelink synchronization signal evaluation.

In one embodiment, the first-type DRX cycle is a long DRX cycle.

In one embodiment, a long DRX cycle corresponds to a long DRX.

In one embodiment, a short DRX cycle corresponds to a short DRX.

In one embodiment, the first-type DRX cycle is a type of DRX cycle other than the long DRX cycle or the short DRX cycle.

In one embodiment, the first signaling comprises configurations of a long DRX cycle, the first-type DRX cycle being a DRX cycle other than the long DRX cycle, and the target DRX cycle being a long DRX cycle comprised by the first signaling.

In one embodiment, Q1 is related to the first candidate time interval set.

In one embodiment, the first candidate cycle set comprises the target DRX cycle.

In one embodiment, the first candidate cycle set comprises at least one time length in the first time length set.

In one embodiment, the first candidate cycle set comprises all time lengths in the first time length set.

In one embodiment, the first candidate cycle set comprises cycles of reference signal resources in the first reference signal resource set.

In one embodiment, the first candidate cycle set comprises a smallest one of cycles of reference signal resources in the first reference signal resource set.

In one embodiment, the first candidate cycle set comprises cycles of reference signal resources for radio link monitoring in the first reference signal resource set.

In one embodiment, the first candidate cycle set comprises cycles of reference signals for radio link monitoring in the first reference signal resource set.

In one embodiment, the first candidate cycle set comprises cycles of SSBs for radio link monitoring in the first reference signal resource set.

In one embodiment, the first candidate cycle set comprises cycles of CSI-RSs for radio link monitoring in the first reference signal resource set.

In one embodiment, the first candidate cycle set comprises cycles of SSBs belonging to $\overline{q}_0$ set in the first reference signal resource set.

In one embodiment, the first candidate cycle set comprises cycles of CSI-RSs belonging to $\overline{q}_0$ set in the first reference signal resource set.

In one embodiment, the SSB in the present application is an SS/PBCH.

In one embodiment, a serving cell of the first node configures the first reference signal resource set.

In one embodiment, a serving cell of the first node configures the first threshold.

In one embodiment, the first node configures the first threshold according to internal algorithm.

In one embodiment, the sentence of performing a first radio link quality evaluation of a first reference signal resource set within a first evaluation cycle to determine whether a result of the first radio link quality evaluation is worse than a first threshold includes a meaning that: completing an evaluation of radio link quality in a last period as long as the first evaluation cycle, and determining whether a result of the evaluation of radio link quality is worse than the first threshold.

In one embodiment, the sentence of performing a first radio link quality evaluation of a first reference signal resource set within a first evaluation cycle to determine whether a result of the first radio link quality evaluation is worse than a first threshold includes a meaning that: completing an evaluation of radio link quality in the first evaluation cycle, and determining whether a result of the evaluation of radio link quality is worse than the first threshold.

In one embodiment, the sentence of performing a first radio link quality evaluation of a first reference signal resource set within a first evaluation cycle to determine whether a result of the first radio link quality evaluation is worse than a first threshold includes a meaning that: the first node is supposed to be able to evaluate within the first evaluation cycle, that a downlink quality estimated within a period determined in a last said first evaluation cycle according to the first reference signal resource set is worse than the first threshold.

In one subembodiment, the first reference signal resource set comprises reference signal resources used for radio link monitoring (RLM).

In one subembodiment, the first reference signal resource set comprises SSB resources used for radio link monitoring (RLM).

In one subembodiment, the first reference signal resource set comprises CSI-RS resources used for radio link monitoring (RLM).

In one subembodiment, the first threshold is related to the first evaluation cycle.

In one subembodiment, the first threshold is $Q_{out\_SSB}$, and the first evaluation cycle is $T_{Evaluate\_out\_SSB}$.

In one subembodiment, the first threshold is $Q_{in\_SSB}$, and the first evaluation cycle is $T_{Evaluate\_in\_SSB}$.

In one subembodiment, the first threshold is $Q_{out\_CSI-RS}$, and the first evaluation cycle is $T_{Evaluate\_out\_CSI-RS}$.

In one subembodiment, the first threshold is $Q_{in\_CSI-RS}$, and the first evaluation cycle is $T_{Evaluate\_in\_CSI-RS}$.

In one subembodiment, the result of the first radio link quality evaluation is a downlink quality estimated within a period determined in a last said first evaluation cycle according to the first reference signal resource set.

In one embodiment, the sentence of performing a first radio link quality evaluation of a first reference signal resource set within a first evaluation cycle to determine whether a result of the first radio link quality evaluation is worse than a first threshold includes a meaning that: the first node is supposed to be able to evaluate within the first evaluation cycle, that a downlink quality estimated within a period determined in a last said first evaluation cycle according to the first reference signal resource set is worse than the first threshold.

In one subembodiment, the first reference signal resource set comprises reference signal resources in $\overline{q}_0$.

In one subembodiment, the first reference signal resource set comprises SSB resources in $\overline{q}_0$.

In one subembodiment, the first reference signal resource set comprises CSI-RS resources in $\overline{q}_0$.

In one subembodiment, the first threshold is related to the first evaluation cycle.

In one subembodiment, the first threshold is $Q_{out\_LR\_SSB}$, and the first evaluation cycle is $T_{Evaluate\_BFD\_SSB}$.

In one subembodiment, the first threshold is $Q_{out\_LR\_CSI-RS}$, and the first evaluation cycle is $T_{Evaluate\_BFD\_CSI-RS}$.

In one subembodiment, the result of the first radio link quality evaluation is a downlink quality estimated within a period determined in a last said first evaluation cycle according to the first reference signal resource set.

In one embodiment, the first parameter is P.

In one embodiment, for the definition and usage of the first parameter, refer to 3GPP TS 38.133 v17.

In one embodiment, the phrase that a second parameter is dependent on the first candidate time interval set means that: the second parameter is determined according to a number of candidate time interval(s) comprised by the first candidate time interval set.

In one embodiment, the phrase that a second parameter is dependent on the first candidate time interval set means that: when the number of candidate time intervals comprised by the first candidate time interval set is greater than 1, the second parameter is applied.

In one embodiment, the phrase that a second parameter is dependent on the first candidate time interval set means that: the second parameter is equal to an approximate value of $1/(y+K_x)$ or $1/(y+K_x)$, where the first candidate time interval set comprises $K_x$ candidate time interval(s), and y is an integer.

In one subembodiment, y is equal to 0.

In one subembodiment, y is equal to 1.

In one subembodiment, y is equal to −1.

In one embodiment, the phrase that a second parameter is dependent on the first candidate time interval set means that: the second parameter is equal to $(y+K_x)$, where the first candidate time interval set comprises $K_x$ candidate time interval(s), and y is an integer.

In one subembodiment, y is equal to 0.

In one subembodiment, y is equal to 1.

In one subembodiment, y is equal to −1.

In one embodiment, the first signaling indicates a value of the second parameter.

In one embodiment, the phrase that a second parameter is dependent on the first candidate time interval set means that: when the number of candidate time interval(s) comprised by the first candidate time interval set is greater than 1, the second parameter is unequal to 1.

In one embodiment, the phrase that a second parameter is dependent on the first candidate time interval set means that: when the number of candidate time interval(s) comprised by the first candidate time interval set is equal to 1, the second parameter is equal to 1.

In one embodiment, the phrase that a second parameter is dependent on the first candidate time interval set means that: when the number of candidate time interval(s) comprised by the first candidate time interval set is equal to 1, the second parameter is not applied.

In one embodiment, the phrase that a second parameter is dependent on the first candidate time interval set means that: before receiving the first signaling, the value of the second parameter is equal to 1 or the second parameter is not applied.

In one embodiment, the phrase that a second parameter is dependent on the first candidate time interval set means that: before the first candidate time interval set is determined or configured, the value of the second parameter is equal to 1 or the second parameter is not applied.

In one embodiment, the phrase that a second parameter is dependent on the first candidate time interval set means that: a number of the DRX(s) of the first cell group configured by the first signaling is K; the DRX(s) of the first cell group configured by the first signaling determines/determine the first candidate time interval; a value of the second parameter depends on K.

In one subembodiment, the value of the second parameter is equal to K.

In one subembodiment, the value of the second parameter is equal to 1/K, or an approximate value of 1/K.

In one subembodiment, the value of the second parameter is equal to an approximate value of 1/(K+1) or 1/(K+1).

In one subembodiment, the value of the second parameter is equal to an approximate value of 1/(K−1) or 1/(K−1).

In one subembodiment, K is a positive integer greater than 1.

In one subembodiment, K is a positive integer.

In one subembodiment, when the number of candidate time intervals comprised by the first candidate time interval set is greater than 1, K is greater than 1.

In one subembodiment, when K is greater than 1, the number of candidate time intervals comprised by the first candidate time interval set is greater than 1.

In one subembodiment, the phrase that a number of the DRX(s) of the first cell group configured by the first signaling is K means that: a DRX list for the first cell group configured by the first signaling comprises K DRX(s) or K item(s).

In one subembodiment, the phrase that a number of the DRX(s) of the first cell group configured by the first signaling is K means that: the number of DRX group(s) for the first cell group configured by the first signaling is K.

In one embodiment, the approximate value refers to an approximate value accurate to one decimal place, e.g., the approximate value of ⅓ is 0.3.

In one embodiment, the approximate value refers to an approximate value accurate to two decimal places, e.g., the approximate value of ⅓ is 0.33.

In one embodiment, the phrase that a result yielded by rounding the first value up to a nearest integer is equal to Q1 means that: rounding a value up to a nearest integer uses Ceil ( ) function.

In one embodiment, the phrase that a result yielded by rounding the first value up to a nearest integer is equal to Q1 means that Q1=Ceil (first value), where Ceil ( ) is Round Up Function.

In one embodiment, the phrase that a first value is linear with a product of the first parameter and the second parameter means that: the first value is equal to a product of the first parameter and the second parameter.

In one embodiment, the phrase that a first value is linear with a product of the first parameter and the second parameter means that: the first value is equal to a product of the first parameter and the second parameter being multiplied by a second value, where the second value is equal to one parameter or a product of multiple parameters.

In one subembodiment, the one parameter or product of multiple parameters equal to the second value include a third parameter.

In one subembodiment, the one parameter or product of multiple parameters equal to the second value include a fourth parameter.

In one subembodiment, the one parameter or product of multiple parameters equal to the second value include a fifth parameter.

In one subembodiment, the one parameter or product of multiple parameters equal to the second value include a sixth parameter.

In one subembodiment, the one parameter or multiple parameters equal to the second value include a parameter in a seventh parameter set.

In one embodiment, the phrase that a first value is linear with a product of the first parameter and the second parameter means that: the first value is equal to a sum of an eighth parameter plus a product of the first parameter and the second parameter being multiplied by a second value, where the second value is equal to one parameter or a product of multiple parameters, and the eighth parameter is a non-zero real number.

In one embodiment, the phrase that a first value is linear with a product of the first parameter and the second parameter means that: the first value is equal to a product of the first parameter and the second parameter being multiplied by at least one parameter in an eighth parameter set.

In one embodiment, the first value satisfies Ceil(P×L), where P is the first parameter, and L represents the second parameter.

In one embodiment, the first value satisfies Ceil(C×P×L), where C represents the third parameter, P is the first parameter, and L represents the second parameter.

In one embodiment, the first value satisfies Ceil(C×P×L×N), where C represents the third parameter, P is the first parameter, L represents the second parameter, and N is a fourth parameter.

In one embodiment, the first value satisfies Ceil(C×P×L×$M_{out}$), where C represents the third parameter, P is the first parameter, L represents the second parameter, and $M_{out}$ is a fifth parameter.

In one embodiment, the first value satisfies Ceil(C×P×L×$M_{in}$), where C represents the third parameter, P is the first parameter, L represents the second parameter, and $M_{in}$ is a fifth parameter.

In one embodiment, the first value satisfies Ceil(C×P×L×$M_{BFD}$), where C represents the third parameter, P is the first parameter, L represents the second parameter, and $M_{BFD}$ is a fifth parameter.

In one embodiment, the first value satisfies Ceil(C×P×L×$M_{BFD}$×$P_{BFD}$), where C represents the third parameter, P is the first parameter, L represents the second parameter, $M_{BFD}$ is a fifth parameter, and $P_{BFD}$ is a sixth parameter.

In one embodiment, the first value satisfies Ceil Ceil(C×P×L×K1), where C represents the third parameter, P is the first parameter, L represents the second parameter and K1 is a parameter in a seventh parameter set.

In one embodiment, the first value satisfies Ceil(C×P×L×K2), where C represents the third parameter, P is the first parameter, L represents the second parameter and K2 is a parameter in a seventh parameter set.

In one embodiment, a candidate value of C includes one of 1.5, 7.5, or 15.

In one embodiment, an eighth parameter is related to a number of elements in the first candidate time interval set, and an eighth parameter set comprises at least the first parameter; when the number of the elements in the first candidate time interval set is greater than 1, the first value is equal to a sum of the eighth parameter and a product of the second parameter and at least the first parameter in the eighth parameter set.

In one embodiment, the eighth parameter set comprises the third parameter.

In one embodiment, the eighth parameter set comprises the fourth parameter.

In one embodiment, the eighth parameter set comprises the fifth parameter.

In one embodiment, the eighth parameter set comprises the sixth parameter.

In one embodiment, the eighth parameter set comprises each parameter in the seventh parameter set.

In one embodiment, the phrase that an eighth parameter is related to a number of elements in the first candidate time interval set means that: only when there is more than one candidate time interval being comprised by the first candidate time interval set will the eighth parameter be applied.

In one embodiment, the phrase that an eighth parameter is related to a number of elements in the first candidate time interval set means that: only when there is more than one candidate time interval being comprised by the first candidate time interval set will the value of the eighth parameter be non-zero.

In one embodiment, the phrase that an eighth parameter is related to a number of elements in the first candidate time interval set means that: only when there is one candidate time interval being comprised by the first candidate time interval set will the value of the eighth parameter be zero.

In one embodiment, any serving cell can belong to multiple DRX groups or DRX sub-groups of the first cell group.

In one embodiment, any serving cell of the first cell group can belong to multiple DRX groups or DRX sub-groups of the first cell group configured by the first signaling.

In one embodiment, DRXs configured by the first signaling include an extra DRX.

In one embodiment, DRXs configured by the first signaling include a DRX for traffics.

In one embodiment, DRXs configured by the first signaling are not conventional DRXs.

In one embodiment, the DRXs configured by the first signaling are not sidelink DRXs.

In one embodiment, the DRXs configured by the first signaling are not DRXs for broadcast or multicast.

In one embodiment, the active time of a DRX group corresponding to the first cell group is the time during which the first node is required to listen over a PDCCH for a C-RNTI.

In one embodiment, the active time of a DRX group corresponding to the first cell group is the time during which the first node is required to listen over a PDCCH in an attempt to receive downlink control information (DCI) used for uplink resource allocation.

In one embodiment, the active time of a DRX group corresponding to the first cell group is the time during which the first node is required to listen over a PDCCH in an attempt to receive DCI used for downlink scheduling.

In one embodiment, the active time of a DRX group corresponding to the first cell group is the time during which the first node is awake.

In one embodiment, the first node needn't listen over a PDCCH for a C-RNTI in any time other than the active time of a DRX group corresponding to the first cell group.

In one embodiment, the first node needn't listen over a PDCCH in any time other than the active time of a DRX group corresponding to the first cell group in an attempt to receive DCI used for uplink resource allocation.

In one embodiment, the first node needn't listen over a PDCCH in any time other than the active time of a DRX group corresponding to the first cell group in an attempt to receive DCI used for downlink scheduling.

Embodiment 2

Figure 2:
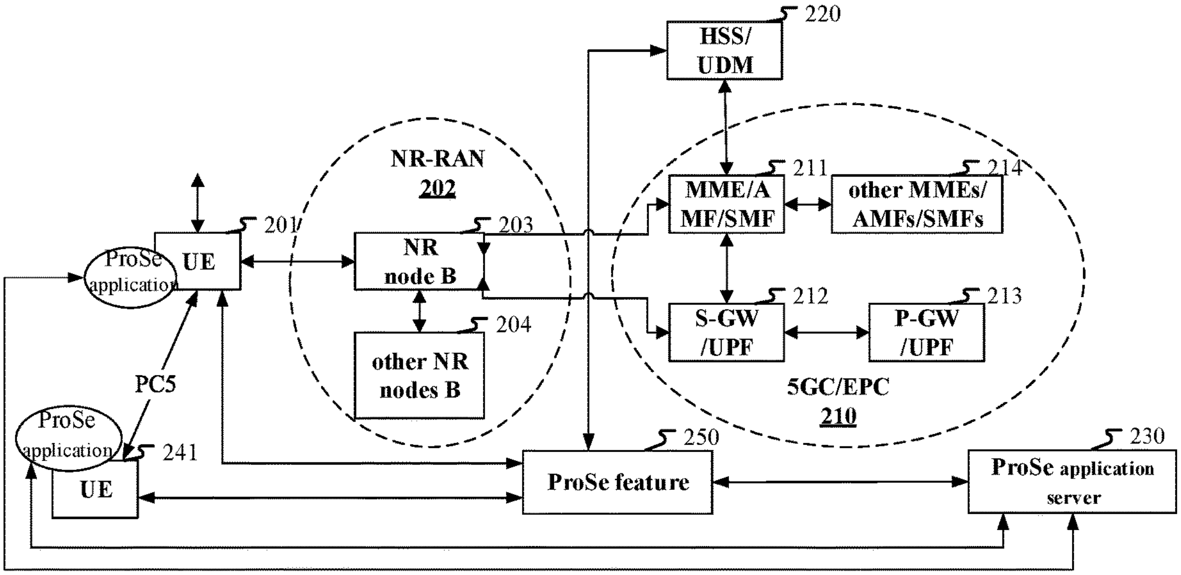
FIG. 2 illustrates a schematic diagram of a network architecture according to one embodiment of the present application.

Embodiment 2 illustrates a schematic diagram of a network architecture according to the present application, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called 5G System/Evolved Packet System (5GS/EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the first node in the present application is the UE 201.

In one embodiment, a base station of the second node in the present application is the gNB 203.

In one embodiment, a radio link from the UE 201 to the NR Node B is an uplink.

In one embodiment, a radio link from the NR Node B to the UE 201 is a downlink.

In one embodiment, the UE 201 supports relay transmission.

In one embodiment, the UE 201 includes cellphone.

In one embodiment, the UE 201 is a means of transportation including automobile.

In one embodiment, the UE 201 supports sidelink transmission.

In one embodiment, the UE 201 supports MBS transmission.

In one embodiment, the UE 201 supports MBMS transmission.

In one embodiment, the gNB 203 is a MacroCellular base station.

In one embodiment, the gNB 203 is a Micro Cell base station.

In one embodiment, the gNB 203 is a PicoCell base station.

In one embodiment, the gNB 203 is a flight platform.

In one embodiment, the gNB 203 is satellite equipment.

Embodiment 3

Figure 3:
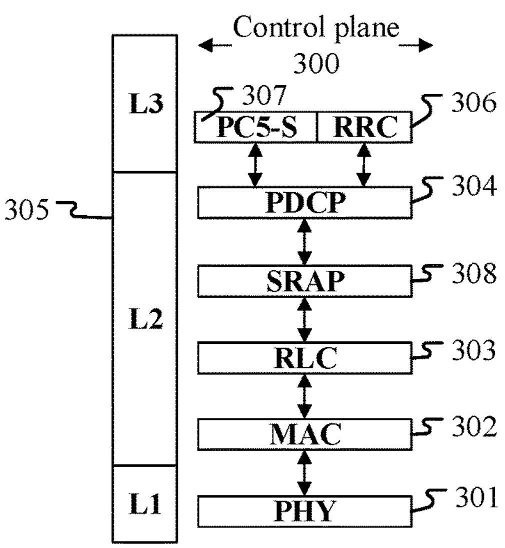
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB or, satellite or aircraft in NTN) and a second node (gNB, UE, or satellite or aircraft in NTN), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between a first node and a second node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The PC5 Signaling Protocol (PC5-S) sublayer 307 is responsible for processing the signaling protocol at the PC5 interface. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. An SRB can be seen as the service or interface provided by a PDCP layer for a higher layer, such as RRC layer. The SRBs in an NR system include SRB1, SRB2, and SRB3, and optionally, SRB4 when concerning sidelink communications, which are respectively used for transmitting all types of control signalings. The SRB is a bearer between a UE and an access network used for transmitting control signalings between them, including an RRC signaling. The SRB1 has special meaning to the UE, since for each UE that has established RRC connection, there is an SRB1 that is used for transmitting RRC signaling, and most signalings are transmitted via the SRB1. If the SRB1 is interrupted or cannot work, the UE will have to perform RRC re-establishment. The SRB2 is generally used for transmitting NAS signaling or any signaling concerning security. The UE can be configured without the SRB3. Unless for urgent traffics, the UE must establish an RRC connection with the network to proceed with communications. Although not described in FIG. 3, the first node may comprise several higher layers above the L2 355. Besides, the first node comprises a network layer (i.e., IP layer) terminated at a P-GW 213 of the network side and an application layer terminated at the other side of the connection (i.e., a peer UE, a server, etc.). For a UE involving relay services, its control plane can also comprise an Adaptation sublayer Sidelink Relay Adaptation Protocol (SRAP) 308, and its user plane can also comprise an Adaptation sublayer SRAP358. The introduction of the Adaptation layer is beneficial to lower layers, for instance, a MAC layer, or an RLC layer, to multiplex and/or distinguish data from multiple source UEs. For nodes not joined in relay communications, none of the PC5-S307, SRAP308 and SRAP358 will be needed in the process of communications.

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the RRC 306 or the MAC 302.

In one embodiment, the first message in the present application is generated by the RRC 306.

In one embodiment, the first QoS information in the present application is generated by the RRC 306 or NAS.

Embodiment 4

Figure 4:
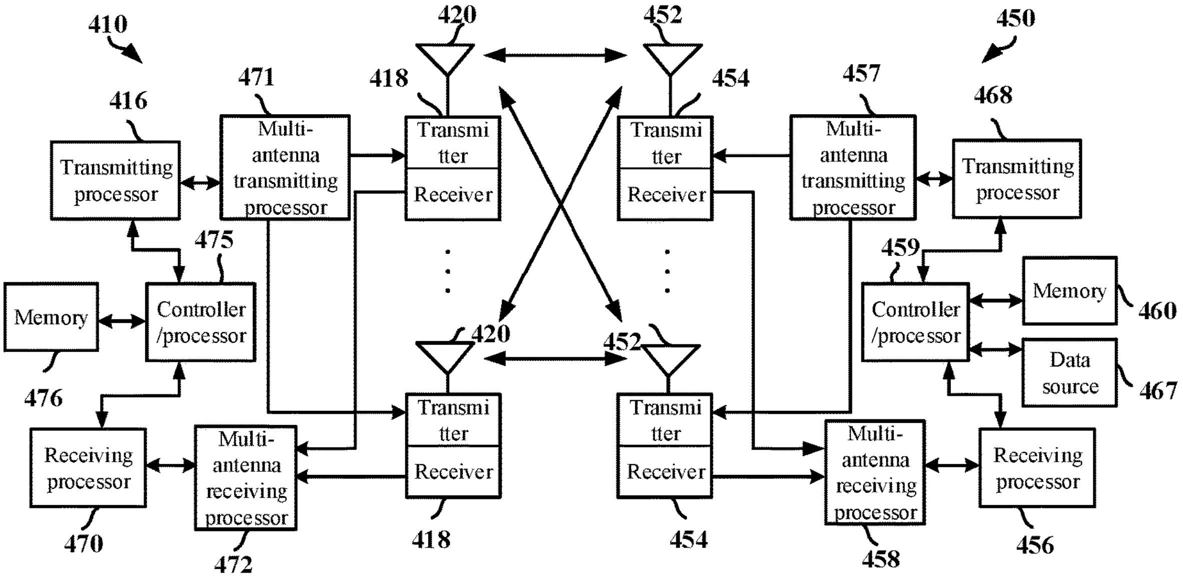
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, and optionally a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, and optionally a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer (Layer-2). In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: receives a first signaling, the first signaling used for configuring DRX of a first cell group; the DRX of the first cell group configured by the first signaling being for a first MAC entity; and listens over a PDCCH within active time of any DRX group corresponding to the first cell group; performs a first radio link quality evaluation of a first reference signal resource set within a first evaluation cycle to determine whether a result of the first radio link quality evaluation is worse than a first threshold; herein, the first signaling comprises a first time length set, the first time length set comprising at least a first time length; any time length in the first time length set is a first-type DRX cycle; a system frame number, a subframe number and the first time length set are used together to determine a first time window set; the active time of the DRX group corresponding to the first cell group comprises the first time window set; a time interval between any two adjacent time windows in the first time window set is a candidate time interval in a first candidate time interval set and the first candidate time interval set comprises at least a first time interval and a second time interval, the first time interval being unequal to the second time interval; the first evaluation cycle comprises Q1 first target cycles; the first target cycle is a candidate cycle in a first candidate cycle set, at least one time length in the first time length set being used to determine the first target cycle; Q1 is a positive integer; a first parameter is dependent on a measurement gap, while a second parameter is dependent on the first candidate time interval set, a first value is linear with a product of the first parameter and the second parameter, and a result yielded by rounding the first value up to a nearest integer is equal to Q1; the DRX of the first cell group configured by the first signaling is unrelated to PTM.

In one embodiment, the first communication node 450 comprises a memory that stores a computer readable instruction program, the computer readable instruction program generates actions when executed by at least one processor, which include: receiving a first signaling, the first signaling used for configuring DRX of a first cell group; the DRX of the first cell group configured by the first signaling being for a first MAC entity; and listening over a PDCCH within active time of any DRX group corresponding to the first cell group; performing a first radio link quality evaluation of a first reference signal resource set within a first evaluation cycle to determine whether a result of the first radio link quality evaluation is worse than a first threshold; herein, the first signaling comprises a first time length set, the first time length set comprising at least a first time length; any time length in the first time length set is a first-type DRX cycle; a system frame number, a subframe number and the first time length set are used together to determine a first time window set; the active time of the DRX group corresponding to the first cell group comprises the first time window set; a time interval between any two adjacent time windows in the first time window set is a candidate time interval in a first candidate time interval set and the first candidate time interval set comprises at least a first time interval and a second time interval, the first time interval being unequal to the second time interval; the first evaluation cycle comprises Q1 first target cycles; the first target cycle is a candidate cycle in a first candidate cycle set, at least one time length in the first time length set being used to determine the first target cycle; Q1 is a positive integer; a first parameter is dependent on a measurement gap, while a second parameter is dependent on the first candidate time interval set, a first value is linear with a product of the first parameter and the second parameter, and a result yielded by rounding the first value up to a nearest integer is equal to Q1; the DRX of the first cell group configured by the first signaling is unrelated to PTM.

In one embodiment, the first communication device 450 corresponds to the first node in the present application.

In one embodiment, the second communication device 410 corresponds to the second node in the present application.

In one embodiment, the first communication device 450 is a UE.

In one embodiment, the first communication device 450 is a vehicle-mounted terminal.

In one embodiment, the first communication device 450 is a relay.

In one embodiment, the second communication device 410 is a satellite.

In one embodiment, the second communication device 410 is an aircraft.

In one embodiment, the second communication device 410 is a base station.

In one embodiment, the receiver 454 (comprising the antenna 452), the receiving processor 456 and the controller/processor 459 are used for receiving the first signaling in the present application.

In one embodiment, the receiver 454 (comprising the antenna 452), the receiving processor 456 and the controller/processor 459 are used for receiving the first QoS information in the present application.

In one embodiment, the transmitter 454 (comprising the antenna 452), the transmitting processor 468 and the controller/processor 459 are used for transmitting the first message in the present application.

Embodiment 5

Figure 5:
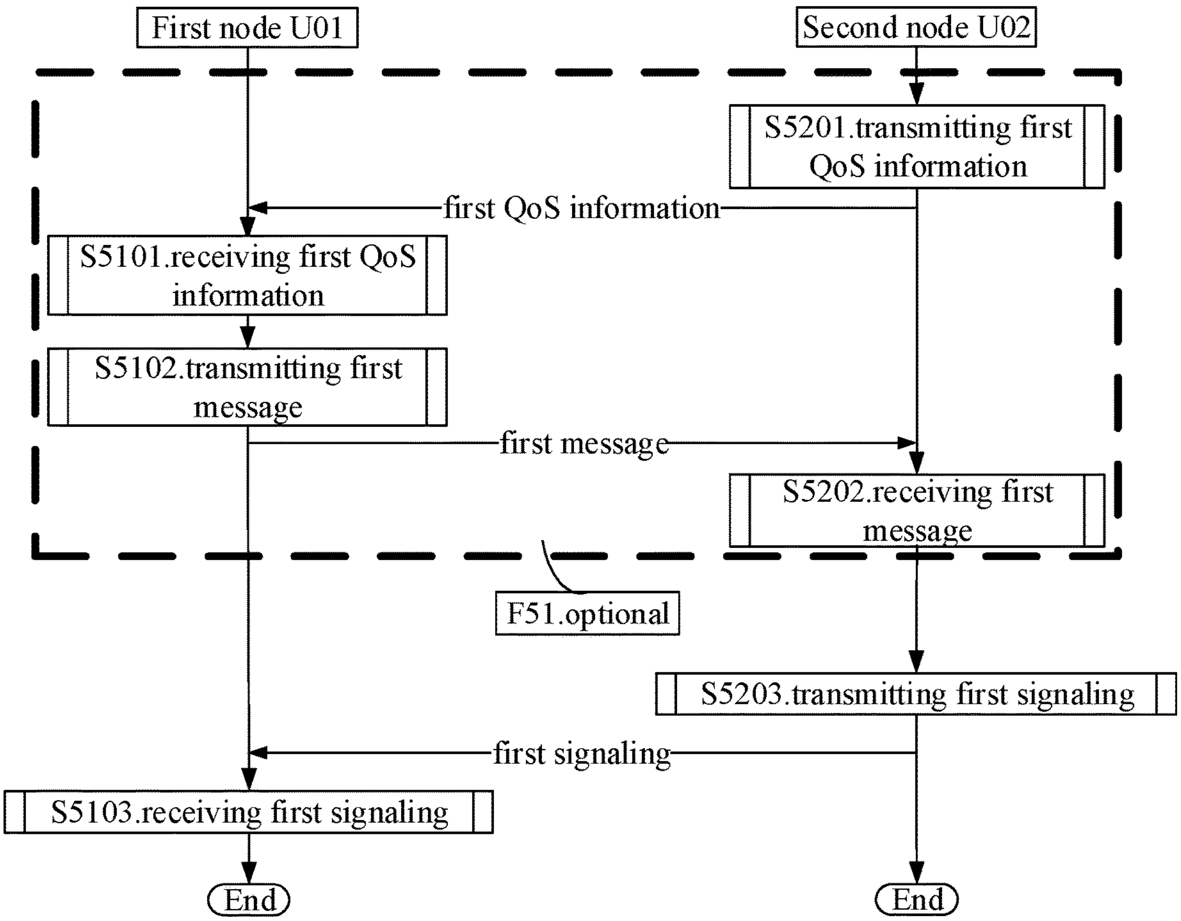
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, U01 corresponds to the first node in the present application, and U02 corresponds to the second node in the present application. It should be particularly noted that the sequence illustrated herein does not set any limit on the orders in which signals are transmitted and implementations in this present application. Herein, steps in F51 are optional.

The first node U01 receives first QoS information in step S5101; transmits a first message in step S5102; and receives a first signaling in step S5103.

The second node U02 transmits first QoS information in step S5201; receives a first message in step S5202; and transmits a first signaling in step S5203.

In Embodiment 5, the first signaling is used for configuring DRX of a first cell group; the DRX of the first cell group configured by the first signaling being for a first MAC entity; the first node U01, listening over a PDCCH within active time of any DRX group corresponding to the first cell group; the first node U01, performing a first radio link quality evaluation of a first reference signal resource set within a first evaluation cycle to determine whether a result of the first radio link quality evaluation is worse than a first threshold; the first signaling comprises a first time length set, the first time length set comprising at least a first time length; any time length in the first time length set is a first-type DRX cycle; a system frame number, a subframe number and the first time length set are used together to determine a first time window set; the active time of the DRX group corresponding to the first cell group comprises the first time window set; a time interval between any two adjacent time windows in the first time window set is a candidate time interval in a first candidate time interval set and the first candidate time interval set comprises at least a first time interval and a second time interval, the first time interval being unequal to the second time interval; the first evaluation cycle comprises Q1 first target cycles; the first target cycle is a candidate cycle in a first candidate cycle set, at least one time length in the first time length set being used to determine the first target cycle; Q1 is a positive integer; a first parameter is dependent on a measurement gap, while a second parameter is dependent on the first candidate time interval set, a first value is linear with a product of the first parameter and the second parameter, and a result yielded by rounding the first value up to a nearest integer is equal to Q1; the DRX of the first cell group configured by the first signaling is unrelated to PTM.

In one embodiment, the first node U01 is a UE, and the second node U02 is a serving cell or a cell group of the first node U01.

In one embodiment, the first node U01 is a UE, and the second node U02 is a base station serving the first node U01.

In one embodiment, the first node U01 transmits the first message via an uplink.

In one embodiment, the first node U01 transmits the first signaling via a downlink.

In one embodiment, the second node U02 is the first cell group.

In one embodiment, the second node U02 is a serving cell in the first cell group.

In one embodiment, the second node U02 is an MN of the first cell group.

In one embodiment, the first QoS information is used for indicating at least one of the first time interval or the second time interval or the first time length set.

In one embodiment, the first QoS information is for first service.

In one embodiment, the first service refers to interactive service.

In one embodiment, the first service refers to XR service.

In one embodiment, the first service refers to service having strict demands on delay.

In one embodiment, the first service refers to service having strict demands on power conservation.

In one embodiment, the first QoS information comprises 5QI.

In one embodiment, the first QoS information comprises a quality indicator.

In one embodiment, the first QoS information comprises QoS features.

In one embodiment, the first QoS information comprises an arriving time interval.

In one embodiment, the first QoS information comprises a service model or a service arrival model.

In one embodiment, the first QoS information comprises delay requirements.

In one embodiment, the first QoS information comprises a packet delay budget (PDB).

In one embodiment, the first QoS information comprises parameters of a PDU set.

In one embodiment, the first QoS information comprises an arrival rate or a frame rate.

In one subembodiment, the arrival rate or the frame rate is used to determine the first time length.

In one embodiment, the first QoS information is NAS information.

In one embodiment, the first QoS information is generated by the second node U02.

In one embodiment, the first QoS information is information generated by a NAS forwarded by the second node U02.

In one embodiment, the first QoS information is information generated by an application layer forwarded by the second node U02.

In one embodiment, the first QoS information triggers the first message.

In one embodiment, the first QoS information is received before the first message.

In one embodiment, first QoS information is used to indicate at least one of a first time interval, the second time interval or a first time length.

In one embodiment, the first QoS information comprises a first QoS parameter, where there is a mapping relationship between the first QoS parameter comprised in the first QoS information and a group of QoS features.

In one subembodiment, the first QoS parameter comprised in the first QoS information comprises 5QI.

In one embodiment, the group of QoS features include a resource type, a default priority, a PDB, a packet error rate, a default maximum data burst volume, and a default averaging window size; the resource type includes Guaranteed Bit Rate (GBR) and Non-GBR; the default priority is identified by an integer, where the smaller value of the integer the higher priority.

In one embodiment, the first QoS information comprises a group of QoS features.

In one embodiment, the group of QoS features include at least one QoS feature.

In one embodiment, the QoS feature is a QoS-related parameter.

In one embodiment, the group of QoS features include: an interactive latency.

In one embodiment, the group of QoS features include: a roundtrip interactive latency.

In one embodiment, the group of QoS features include: a motion-to-photon latency.

In one embodiment, the group of QoS features include: a roundtrip time (RTT).

In one embodiment, the group of QoS features include: a roundtrip delay.

In one embodiment, the group of QoS features include: a maximum RTT.

In one embodiment, the group of QoS features include: a pose-to-photon time.

In one embodiment, the group of QoS features include: a pose-to-render-to-photon time.

In one embodiment, the group of QoS features include: a roundtrip delay for XR service.

In one embodiment, the group of QoS features include: a RTT for XR services.

In one embodiment, the group of QoS features include: a delay interval.

In one embodiment, the group of QoS features include: an interactive delay interval.

In one embodiment, the group of QoS features include: a minimum interactive latency.

In one embodiment, the group of QoS features include: a maximum interactive latency.

In one embodiment, the group of QoS features include: a minimum RTT.

In one embodiment, the group of QoS features include: a maximum RTT.

In one embodiment, the group of QoS features include: a minimum XR latency.

In one embodiment, the group of QoS features include: a maximum XR latency.

In one embodiment, a delay-related parameter comprised by the group of QoS features is an average value.

In one embodiment, a delay-related parameter comprised by the group of QoS features is a minimum value.

In one embodiment, a delay-related parameter comprised by the group of QoS features is a maximum value.

In one embodiment, the group of QoS features include: a service structure.

In one embodiment, the group of QoS features include: a service model or a service template.

In one embodiment, the group of QoS features include: an uplink packet delay budget (PDB) and a downlink PDB.

In one subembodiment, a sum of the uplink PDB and the downlink PDB is an interactive roundtrip latency.

In one embodiment, the group of QoS features include: a pose-to-response time interval or delay.

In one embodiment, the group of QoS features include: a delay requirement.

In one embodiment, the group of QoS features include: a delay jitter.

In one embodiment, the group of QoS features include: a response time.

In one embodiment, a parameter related to delay comprised by the first QoS information is the first time offset.

In one embodiment, a parameter related to interactive latency comprised by the first QoS information is the first time offset.

In one embodiment, a parameter related to RTT comprised by the first QoS information is the first time offset.

In one embodiment, a parameter related to delay comprised by the first QoS information being through a proximal or rounding operation on a specific value is equal to the first time offset.

In one embodiment, a parameter related to interactive latency comprised by the first QoS information being through a proximal or rounding operation on a specific value is equal to the first time offset.

In one embodiment, a parameter related to round trip time (RTT) comprised by the first QoS information being through a proximal or rounding operation on a specific value is equal to the first time offset.

In one embodiment, a time-related parameter comprised by the group of QoS features is the first time interval.

In one embodiment, a group of time-related parameters comprised by the group of QoS features are the first time interval and the second time interval.

In one embodiment, a delay-related parameter comprised by the group of QoS features is the first time interval.

In one embodiment, a group of delay-related parameters comprised by the group of QoS features are the first time interval and the second time interval.

In one embodiment, an arrival-time-related parameter comprised by the group of QoS features is the first time interval.

In one embodiment, a group of arrival-time-related parameters comprised by the group of QoS features are the first time interval and the second time interval.

In one embodiment, an offset-related parameter comprised by the group of QoS features is used to determine the second time interval.

In one embodiment, an offset-related parameter comprised by the group of QoS features is used to determine the first offset set.

In one embodiment, a parameter related to time or periodicity comprised by the group of QoS features is used to determine the first time length.

In one embodiment, a parameter related to packet rate or periodicity comprised by the group of QoS features is the first time length.

In one embodiment, a DRX-related parameter comprised by the group of QoS features indicates the first time interval.

In one embodiment, a DRX-related parameter comprised by the group of QoS features indicates the second time interval.

In one embodiment, a DRX-related parameter comprised by the group of QoS features indicates the first time length.

In one embodiment, the group of QoS features comprise at least one offset in the first offset set.

In one embodiment, the first message is an RRC message.

In one embodiment, the first message is a MAC CE.

In one embodiment, the first message comprises UEAssistanceInformation.

In one embodiment, the first node U01 transmits a second message, the second message being used to indicate at least one of the first time interval or the second time interval.

In one subembodiment, the first message comprises the first QoS information, the first QoS information being used to indicate the DRX preference.

In one subembodiment, the first message comprises the first time length.

In one subembodiment, the first message comprises the first candidate time interval set.

In one embodiment, the first node U01 transmits a second message, the second message being used to indicate the first time interval and the second time interval.

In one subembodiment, the first message comprises the first QoS information, the first QoS information being used to indicate the DRX preference.

In one subembodiment, the first message comprises the first candidate time interval set.

In one subembodiment, the first message comprises the first time length.

In one embodiment, the second message is an RRC message.

In one embodiment, the second message is a MAC CE.

In one embodiment, the second message comprises UEAssistanceInformation.

In one embodiment, the first message is or includes the second message.

In one embodiment, the first message and the second message are two RRC messages.

In one embodiment, the first message indicates a DRX preference.

In one embodiment, the first message comprises the first time length set.

In one embodiment, the first node U01 starts a first timer as a response to transmitting the first message.

In one embodiment, the first message comprises the first time length.

In one embodiment, the first message comprises at least one offset in the first offset set.

In one embodiment, the running state of the first timer is used to determine whether transmitting DRX-preference related information is allowed or not.

In one embodiment, the first timer is T345.

In one embodiment, the first timer is T346.

In one embodiment, the first timer is T346a.

In one embodiment, the first timer is T346$, where $ is one of b, c, y, z.

In one embodiment, the first message is transmitted before the first signaling.

In one embodiment, the first message comprises the first QoS information.

In one embodiment, the first message comprises the first candidate time interval set.

In one embodiment, the first message comprises the first time interval.

In one embodiment, the first message comprises the second time interval.

In one embodiment, the first message comprises K DRX preferences.

In one embodiment, the first message comprises a DRX-Preference field, the DRX-Preference field comprised by the first message being used to indicate (a) DRX preference(s) of at least one DRX group of the first cell group.

In one embodiment, a cellgroupconfig IE of the first signaling used for configuring the first cell group includes the first signaling.

In one embodiment, the first signaling is or comprises cellgroupconfig for configuring the first cell group.

In one embodiment, the first message comprises a DRX-Preference field, the DRX-Preference field comprised by the first message being used to indicate DRX preference(s) of all DRX groups of the first cell group.

In one embodiment, the first message comprises a second field, the second field comprised by the first message being used to indicate (a) DRX preference(s) of at least one DRX group of the first cell group.

In one subembodiment, a name of the second field in the first message includes DRX.

In one subembodiment, a name of the second field in the first message includes Preference.

In one embodiment, the first message comprises a third field, where a name of the third field includes preferredDRX-LongCycle, the third field comprised by the first message being used to indicate the first time length.

In one embodiment, the first message comprises a first offset set.

In one embodiment, the first message indicates at least one time window in the first time window set.

In one subembodiment, the first message indicates a duration of at least one time window in the first time window set.

In one subembodiment, the first message indicates a start of at least one time window in the first time window set.

In one subembodiment, the first message indicates an end of at least one time window in the first time window set.

In one embodiment, the first message comprises a template for DRX.

In one embodiment, the first message comprises a first index, the first index indicating a group of DRX parameters.

In one subembodiment, the group of DRX parameters is the first signaling.

In one subembodiment, the group of DRX parameters include the first time length.

In one subembodiment, the group of DRX parameters include the first time interval.

In one subembodiment, the group of DRX parameters include the second time interval.

In one subembodiment, the group of DRX parameters include the first candidate time interval set.

In one subembodiment, the group of DRX parameters include the first offset set.

In one subembodiment, the group of DRX parameters are indicated by a message other than the first message.

In one embodiment, the sentence that the running state of the first timer is used to determine whether transmitting DRX-preference related information is allowed or not means that: during the time while the first timer is running, the first node does not transmit any DRX-preference information.

In one embodiment, the sentence that the running state of the first timer is used to determine whether transmitting DRX-preference related information is allowed or not means that: during the time while the first timer is not running, the first node can transmit DRX-preference information.

In one embodiment, the sentence that the running state of the first timer is used to determine whether transmitting DRX-preference related information is allowed or not means that: when the first message is being transmitted, the first timer is not running.

In one embodiment, the first message is used to trigger the first signaling.

In one embodiment, the first QoS information is used to trigger the first message.

In one embodiment, the action of listening over a PDCCH within active time of any DRX group corresponding to the first cell group comprises receiving a first DCI, the first DCI being used to schedule a first physical downlink shared channel (PDSCH), the first PDSCH being used for bearing data of the first service.

Embodiment 6

Figure 6:
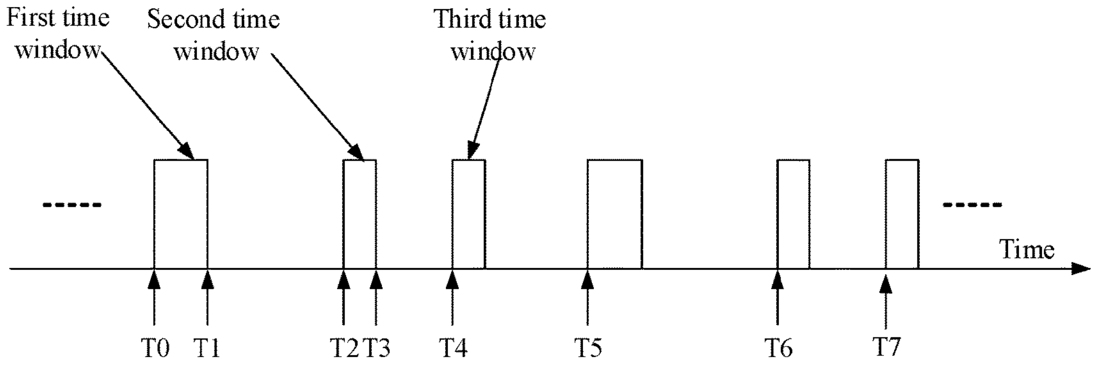
FIG. 6 illustrates a schematic diagram of a first time window set according to one embodiment of the present application.

Embodiment 6 illustrates a schematic diagram of a first time window set according to one embodiment of the present application, as shown in FIG. 6.

As illustrated by FIG. 6, the first time window set comprises 6 time windows; it should be noted that the method provided in the present application is not limited to the number of time windows comprised by the first time window set, which means that the first time window set can comprise more or fewer than what had been given, to which the method always is applicable. In FIG. 6, T0, T1 . . . , T6, and T7 are different times, respectively; where a start of the first time window is T0, and an end of the first time window is T1; a start of the second time window is T2, and an end of the second time window is T3; a start of the third time window is T4; a period between T1 and T2 is equal to the first time interval, and a period between T3 and T4 is equal to the second time interval.

In one embodiment, the first message is transmitted before the time T0.

In one embodiment, the first signaling is received before the time T0.

In one embodiment, time between T0 and T5 is the first time length.

In one embodiment, time windows comprised in the first time window set are of equal lengths.

In one embodiment, time windows comprised in the first time window set are not of equal lengths.

In one embodiment, the first time window set comprises two time windows of unequal lengths.

In one embodiment, when a time interval between any two adjacent time windows in the first time window set and a time interval between any other two adjacent time windows in the first time window set are mutually equal, a number of time window(s) in the first time window set belonging to any period as long as the first time length is equal to 1.

In one embodiment, a number of time windows in the first time window set belonging to any period as long as the first time length is greater than 1.

In one embodiment, when there is a time interval between two adjacent time windows in the first time window set being unequal to a time interval between another two adjacent time windows in the first time window set, a number of time window(s) in the first time window set belonging to any period as long as the first time length is greater than 1.

In one embodiment, when a time interval between any two adjacent time windows in the first time window set is a candidate time interval in a first candidate time interval set and the first candidate time interval set comprises at least a first time interval and a second time interval, a number of time window(s) in the first time window set belonging to any period as long as the first time length is greater than 1.

In one embodiment, a DRX group corresponding to the first cell group is a first DRX group.

In one embodiment, the first time length is a DRX cycle of a first DRX group.

In one embodiment, the first signaling comprises a first offset set, the first offset set comprising K offset(s).

In one subembodiment, when K is equal to 1, within a DRX cycle the first time window set only comprises one time window that belongs to the DRX cycle.

In one subembodiment, when K is greater than 1, within a DRX cycle the first time window set comprises K time windows that belong to the DRX cycle.

In one subembodiment, when K is greater than 2, within a DRX cycle the first time window set comprises K−1 time windows that belong to the DRX cycle.

In one subembodiment, when K is greater than 1, within a DRX cycle the first time window set comprises K+1 time windows that belong to the DRX cycle.

In one subembodiment, the first offset set comprises K offsets, and the K offsets in the first offset set respectively correspond to K time windows in the first time window set, a K1-th offset in the first offset set corresponding to a K1-th time window in the first time window set, where K1 is a positive integer greater than 1 and no greater than K; then the K1-th offset is equal to a difference between a start of the (K1−1)-th time window in the first time window set and a start of the K1-th time window in the first time window set.

In one subembodiment, when K is greater than 1, a length of an earliest time window in the first time window set within a DRX cycle is larger than that of a time window which is not the earliest in the first time window set within the DRX cycle.

In one subembodiment, within a DRX cycle, an earliest one of time windows comprised by the first time window set corresponds to running time of a second DRX timer, where the second DRX timer runs at a start of a DRX cycle, and a time interval between two successive runnings of the second DRX timer is a DRX cycle.

In one subembodiment, within a DRX cycle, an earliest one of time windows comprised by the first time window set corresponds to running time of a second DRX timer, where the second DRX timer is a drx-onDurationTimer.

In one subembodiment, any time window which is not the earliest among time windows comprised by the first time window set within a DRX cycle is unrelated to whether a DRX timer is running.

In one subembodiment, within a DRX cycle, any time window which is not the earliest among time windows comprised by the first time window set is unrelated to whether a DRX timer is running.

In one subembodiment, within a DRX cycle, in any time window which is not the earliest among time windows comprised by the first time window set, a second DRX timer is not running, where the second DRX timer is a drx-onDurationTimer.

In one embodiment, there are at least K time windows being comprised in the first time window set.

In one embodiment, there can be more than K time windows being comprised in the first time window set.

In one embodiment, any two time windows comprised in the first time window set are non-overlapped and non-consecutive.

In one embodiment, there are at least K time windows being comprised in the first time window set, and a number of time windows belonging to any DRX cycle in the first time window set is K.

In one subembodiment, there are more than K time windows being comprised in the first time window set.

In one subembodiment, a number of time windows comprised in the first time window set is an integral multiple of K.

In one embodiment, the first signaling comprises a first template used to determine the first time window set, the first template being used to indicate a first time window template set, the first time window template set comprising more than one consecutive time windows.

In one embodiment, the first time window template set is used for generating or determining the first time window set.

In one subembodiment, the first time window set is generated by deviating the first time window template set by a specific offset in time and repeating periodically in time domain.

In one subembodiment, there exists a specific offset between time windows comprised in the first time window set and periodic repetitions of the first time window template set in time domain.

In one subembodiment, the first signaling comprises the specific offset.

In one embodiment, the first time window template set and a specific offset are used together for generating or determining the first time window set.

In one embodiment, taking FIG. 6 as an example, the first time window template set comprises a first time window, a second time window and a third time window, where a time T5, a time T6 and a time T7 are respectively starts of three time windows of a repetition of the first time window template set in time domain, and a time interval between T0 and T5 is the first time length.

In one embodiment, between T0 and T2 is 17 ms, between T2 and T4 is 16 ms, and between T4 and T5 is 17 ms.

In one embodiment, between T0 and T2 is 17 ms, between T2 and T4 is 17 ms, and between T4 and T5 is 16 ms.

In one embodiment, between T0 and T2 is 16 ms, between T2 and T4 is 17 ms, and between T4 and T5 is 17 ms.

In one embodiment, a time length between T0 and T5 is 50 ms.

In one embodiment, a DRX cycle is a cycle in which a first time window template set is repeated in time domain.

In one embodiment, each time window in a first time window template set corresponds to one time of running of an onduration timer of DRX.

In one embodiment, only one time window in a first time window template set corresponds to one time of running of an onduration timer of DRX.

In one embodiment, the first time window set comprises K sub-time window sets, the K sub-time window sets respectively corresponding to K offsets in the first offset set, where a system frame number, a subframe number, the first time length and any offset in the first offset set are used to determine one of the K sub-time window sets that corresponds to the any offset in the first offset set; a difference between starts of any two adjacent time windows in any sub-time window set of the K sub-time window sets is the first time length.

In one embodiment, the first time window set comprises K sub-time window sets, the K sub-time window sets respectively corresponding to K offsets in the first offset set, where a system frame number, a subframe number, the first time length and any offset in the first offset set are used to determine one of the K sub-time window sets that corresponds to the any offset in the first offset set; the starts of any two adjacent time windows in any sub-time window set of the K sub-time window sets are different by the first time length.

In one embodiment, the first cell group corresponds to K DRX groups, and the first time window set comprises K sub-time window sets, where the starts of any two adjacent time windows in any sub-time window set of the K sub-time window sets are different by the first time length.

In one embodiment, the K sub-time window sets respectively correspond to K DRX groups corresponding to the first cell group.

In one embodiment, the first offset set comprises a first offset, where the first offset and any offset in the first offset set other than the first offset are for different times.

In one subembodiment, K offsets in the first offset set correspond to K time windows in the first time window set.

In one subembodiment, K offsets in the first offset set correspond to K time windows in the first time window set, for instance, the K time windows in the first time window set correspond to a first time window, a second time window and a third time window in FIG. 6, or can further correspond to time window(s) later than the third time window when K is greater than 3.

In one subembodiment, K time windows in the first time window set corresponding to offsets in the first offset set belong to a same DRX cycle.

In one subembodiment, the first offset is a drx-StartOffset.

In one subembodiment, the first offset corresponds to a first time window in the first time window set.

In one subembodiment, the first offset corresponds to a first time window in the first time window set, the first time window being an earliest one of time windows in the first time window set that correspond to K offsets in the first offset set.

In one subembodiment, an offset Oi is any offset other than the first offset in the first offset set, the offset Oi corresponding to an i-th time window in the first time window set, and the offset Oi being an offset of the i-th time window relative to a (i−1)-th time window in the first time window set.

In one subembodiment, an offset Oi is any offset other than the first offset in the first offset set, the offset Oi corresponding to an i-th time window in the first time window set, and the offset Oi being an offset of the i-th time window relative to the first time window in the first time window set.

In one subembodiment, time windows in the first time window set are arranged in an order in time domain, where an i-th time window in the first time window set is a first time window later than a (i−1)-th time window, the i-th time window being any time window in the first time window set.

In one subembodiment, time windows in the first time window set are arranged in an order in time domain, where an i-th time window in the first time window set is a first time window later than a (i−1)-th time window in the first time window set, the i-th time window in the first time window set being any time window in the first time window set.

In one subembodiment, the (i−1)-th time window is a time window earlier than the i-th time window and adjacent to the i-th time window in the first time window set.

In one subembodiment, the sentence of the offset Oi being an offset of the i-th time window relative to a (i−1)-th time window in the first time window set includes a meaning that: the offset Oi is a time interval of a start of the i-th time window relative to a start of the (i−1)-th time window in the first time window set.

In one subembodiment, the sentence of the offset Oi being an offset of the i-th time window relative to a (i−1)-th time window in the first time window set includes a meaning that: the offset Oi is a time interval of a start of the i-th time window relative to an end of the (i−1)-th time window in the first time window set.

In one subembodiment, the sentence of the offset Oi being an offset of the i-th time window relative to the first time window in the first time window set includes a meaning that: the offset Oi is a time interval of a start of the i-th time window relative to a start of the first time window.

In one subembodiment, the sentence of the offset Oi being an offset of the i-th time window relative to the first time window in the first time window set includes a meaning that: the offset Oi is a time interval of a start of the i-th time window relative to an end of the first time window.

In one subembodiment, i is a positive integer greater than 1.

In one subembodiment, the first offset is relative to time 0.

In one subembodiment, the first offset is relative to a fixed time.

In one subembodiment, the first offset is relative to a subframe that is an integral multiple times as much as the first time length.

In one subembodiment, the first offset is relative to a time determined by a first offset before a start of a current DRX cycle.

In one subembodiment, the first offset is relative to X mod the first time length, where X is a sum of 10 times a frame number plus a subframe number.

In one subembodiment, determination of the first time window does not depend on any time window of the K time windows other than the first time window in the first time window set.

In one subembodiment, a k-th time window is any time window of the K time windows other than the first time window in the first time window set; determination of the k-th time window depends on at least one time window among the K time windows other than the k-th time window in the first time window set.

In one embodiment, the first time length set comprises multiple time lengths, and the first signaling comprises a first cycle, the first cycle being a sum of at least two time lengths in the first time length set.

In one subembodiment, the first cycle is a sum of all time lengths in the first time length set.

In one subembodiment, the first cycle is a weighted sum of all time lengths in the first time length set.

In one subembodiment, the first cycle is a positive-integer weighted sum of all time lengths in the first time length set.

In one subembodiment, each time window in the first time window set comprised by the first cycle corresponds to one time of running of an onduration timer of DRX.

In one subembodiment, each time window in the first time window set comprised by the first cycle corresponds to one time of running of a first-type DRX timer.

In one embodiment, the first cycle comprises multiple time windows in the first time window set.

In one embodiment, the first cycle comprises time windows defined by the first time window template set.

In one embodiment, the first cycle comprises time windows defined by the first time window template set adjusted by an offset.

In one embodiment, the first cycle corresponds to a time interval between T0 and T5 in FIG. 6.

Embodiment 7

Figure 7:
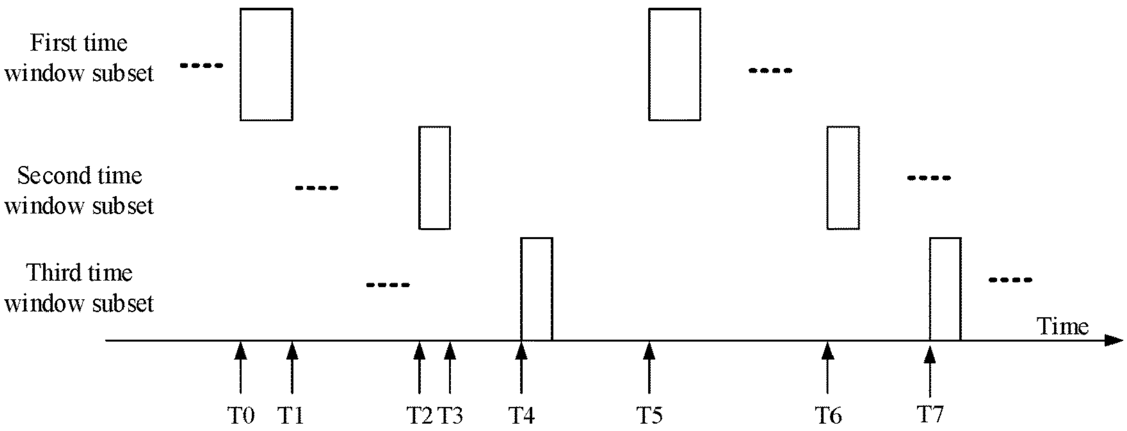
FIG. 7 illustrates a schematic diagram of a first time window set according to one embodiment of the present application.

Embodiment 7 illustrates a schematic diagram of a first time window set according to one embodiment of the present application, as shown in FIG. 7.

As illustrated by FIG. 7, the first time window set comprises 6 time windows; it should be noted that the method provided in the present application is not limited to the number of time windows comprised by the first time window set, which means that the first time window set can comprise more or fewer than what had been given, to which the method always is applicable. In FIGS. 6, T0, T1 . . . , T6 and T7 are different times, respectively; where a start of the first time window is T0, and an end of the first time window is T1; a start of the second time window is T2, and an end of the second time window is T3; a start of the third time window is T4; a period between T1 and T2 is equal to the first time interval, and a period between T3 and T4 is equal to the second time interval.

As illustrated by FIG. 7, the first time window set comprises multiple subsets, like a first time window subset, a second time window subset and a third time window subset; the method provided in the present application does not set a limit over the number of subsets comprised by the first time window set.

In one embodiment, K2 time window subsets comprised by the first time window set respectively correspond to K2 DRX groups of the first cell group, where K2 is a positive integer greater than 1.

In one embodiment, a first time window subset corresponds to a first DRX group of the first cell group.

In one embodiment, a second time window subset corresponds to a second DRX group of the first cell group.

In one embodiment, a third time window subset corresponds to a third DRX group of the first cell group.

In one embodiment, the number of time lengths comprised by the first time length set is less than or equal to K2.

In one embodiment, the first time length set only comprises one time length, that is, the first time length.

In one embodiment, there are determined temporal relations among the K2 time window subsets.

In one embodiment, the first signaling comprises relative temporal relations among the K2 time window subsets.

In one embodiment, the K2 DRX groups of the first cell group use an identical DRX cycle.

In one subembodiment, the identical DRX cycle is the first time length.

In one embodiment, K2 time window subsets comprised by the first time window set respectively correspond to K2 DRX configurations of a DRX list of a first DRX group corresponding to the first cell group, where K2 is a positive integer greater than 1.

In one embodiment, a first time window subset corresponds to a first DRX configuration of a DRX list of a first DRX group corresponding to the first cell group.

In one embodiment, a second time window subset corresponds to a second DRX configuration of a DRX list of a first DRX group corresponding to the first cell group.

In one embodiment, a third time window subset corresponds to a third DRX configuration of a DRX list of a first DRX group corresponding to the first cell group.

In one embodiment, the number of time lengths comprised by the first time length set is less than or equal to K2.

In one embodiment, the first time length set only comprises one time length, that is, the first time length.

In one embodiment, there are determined temporal relations among the K2 time window subsets.

In one embodiment, the first signaling comprises relative temporal relations among the K2 time window subsets.

In one embodiment, different DRX configurations of a DRX list of a first DRX group corresponding to the first cell group apply an identical DRX cycle.

In one subembodiment, the identical DRX cycle is the first time length.

Embodiment 8

Figure 8:
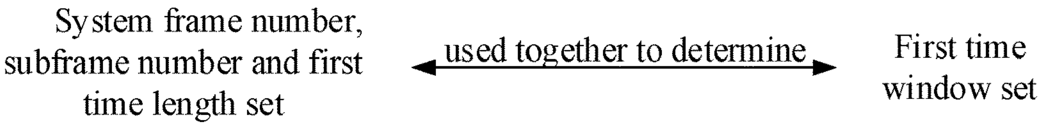
FIG. 8 illustrates a schematic diagram of a system frame number, a subframe number and a first time length set being used together to determine a first time window set according to one embodiment of the present application.

Embodiment 8 illustrates a schematic diagram of a system frame number, a subframe number and a first time length set being used together to determine a first time window set according to one embodiment of the present application, as shown in FIG. 8.

In one embodiment, any two time windows in the first time window set are of equal sizes.

In one embodiment, a size of each time window in the first time window set is fixed.

In one embodiment, a size of each time window in the first time window set is configurable.

In one embodiment, a size of each time window in the first time window set is configured by an RRC signaling.

In one embodiment, a size of each time window in the first time window set is configured by the first signaling.

In one embodiment, any time window in the first time window set comprises an integral number of subframe(s).

In one embodiment, at least one time window in the first time window set can comprise a non-integral number of subframe(s).

In one embodiment, at least one time window in the first time window set comprises a non-integral number of subframe(s).

In one embodiment, the first signaling indicates a first offset set.

In one embodiment, a drx-LongCycleStartOffset field in the first signaling indicates an offset in the first offset set.

In one embodiment, a drx-SlotOffset field in the first signaling indicates an offset in the first offset set.

In one embodiment, the first offset set only comprises one offset.

In one embodiment, the first offset set only comprises two offsets.

In one embodiment, the first offset set only comprises more than 2 offsets.

In one embodiment, the first offset set only comprises K offsets, where the first signaling configures K DRXs of the first cell group.

In one embodiment, the first offset set only comprises 2K offsets, where the first signaling configures K DRXs of the first cell group.

In one embodiment, the sentence that a system frame number, a subframe number and a first time length set being used together to determine a first time window set includes a meaning that a system frame number, a subframe number and the first time length set are used together to determine a start of any time window in the first time window set.

In one embodiment, the sentence that a system frame number, a subframe number and a first time length set being used together to determine a first time window set includes a meaning that a system frame number, a subframe number and the first time length set are used together to determine a frame and a subframe of a start of any time window in the first time window set.

In one embodiment, the first signaling is used for configuring a long DRX.

In one subembodiment, the first time length corresponds to a DRX cycle.

In one subembodiment, the first time length comprises a positive integer number of subframe(s).

In one subembodiment, each time determined by system frames and subframes that satisfy (SFNx*10+s) % (T)=OF corresponds to a start of a time window in the first time window set, where SFNx is a system frame number, s is a subframe number, OF is an offset in the first offset set, and T is the first time length, with % symbolizing modulus operation.

In one embodiment, the first time window set comprises Kx sub-time-window sets, and any time window in an i-th sub-time-window set among the Kx sub-time-window sets starts with a subframe with a subframe number s in a system frame numbered with SFNx, then the SFNx and the s satisfy (SFNx*10+s) % (T)=OFi, where T is the first time length, OFi is an i-th offset in the first offset set, with % symbolizing modulus operation.

In one embodiment, times determined by all system frames and subframes that satisfy (SFNx*10+s) % (T)=OFi respectively correspond to start times of time windows in an i-th sub-time-window set in the first time window set, where T is the first time length, OFi is an i-th offset in the first offset set, with % symbolizing modulus operation, SFNx is a system frame number, and s is a subframe number; the first time window set comprises K sub-time-window sets, and the i-th sub-time-window set is one of the K sub-time-window sets in the first time window set.

In one embodiment, the first time window set comprises Kx sub-time-window sets, and any time window in an i-th sub-time-window set among the Kx sub-time-window sets starts with a subframe with a subframe number s in a system frame numbered with SFNx, then the SFNx and the s satisfy (SFNx*10+s) % (T)=OFi % (T), where T is the first time length, OFi is an i-th offset in the first offset set, with % symbolizing modulus operation.

In one embodiment, times determined by all system frames and subframes that satisfy (SFNx*10+s) % (T)=OFi % (T) respectively correspond to start times of time windows in an i-th sub-time-window set in the first time window set, where T is the first time length, OFi is an i-th offset in the first offset set, with % symbolizing modulus operation, SFNx is a system frame number, and s is a subframe number; the first time window set comprises Kx sub-time-window sets, and the i-th sub-time-window set is one of the Kx sub-time-window sets in the first time window set.

In one embodiment, the sentence that a system frame number, a subframe number and a first time length set being used together to determine a first time window set includes a meaning that a system frame number, a subframe number, the first time length set and a first offset set are used together to determine a start of any time window in the first time window set by means of a formula using modulus operation.

In one embodiment, K offsets in the first offset set respectively correspond to K time windows in the first time window set.

In one embodiment, an i-th offset in the first offset set is used for generating an i-th time window in the first time window set, where the i-th offset in the first offset set is any offset in the first offset set.

In one embodiment, the j-th time window is a time window adjacent to the i-th time window.

In one embodiment, the j-th time window is a first of all time windows in the first time window set.

In one embodiment, the j-th time window is a first one among the K time windows in the first time window set.

In one embodiment, the j-th time window belongs to a same DRX cycle as the K time windows in the first time window set.

In one embodiment, times determined by all system frames and subframes that satisfy f ((SFNx*10+s)) % f(T) =f(OFi) respectively correspond to start times of time windows in an i-th sub-time-window set in the first time window set, where T is the first time length, OFi is an i-th offset in the first offset set, with % symbolizing modulus operation, SFNx is any system frame number, and s is any subframe number; the first time window set comprises Kx sub-time-window sets, and the i-th sub-time-window set is one of the Kx sub-time-window sets in the first time window set; f( ) is a function.

In one subembodiment, f( ) is rounding function.

In one subembodiment, f( ) is a function multiplied by N, where N is a positive integer.

In one embodiment, times determined by all system frames and subframes that satisfy f((SFNx*10+s)) % f(T) =f(OFi) % f(T) respectively correspond to start times of time windows in an i-th sub-time-window set in the first time window set, where T is the first time length, OFi is an i-th offset in the first offset set, with % symbolizing modulus operation, SFNx is any system frame number, and s is any subframe number; the first time window set comprises Kx sub-time-window sets, and the i-th sub-time-window set is one of the Kx sub-time-window sets in the first time window set; f( ) is a function.

In one subembodiment, f( ) is rounding function.

In one subembodiment, f( ) is a function multiplied by N, where N is a positive integer.

In one embodiment, times determined by all system frames and subframes that satisfy f((SFNx*10+s) % (T))=f (OFi) respectively correspond to start times of time windows in an i-th sub-time-window set in the first time window set, where T is the first time length, OFi is an i-th offset in the first offset set, with % symbolizing modulus operation, SFNx is any system frame number, and s is any subframe number; the first time window set comprises Kx sub-time-window sets, and the i-th sub-time-window set is one of the Kx sub-time-window sets in the first time window set; f( ) is a function.

In one subembodiment, f( ) is rounding function.

In one subembodiment, f( ) is a function multiplied by N, where N is a positive integer.

In one embodiment, times determined by all system frames and subframes that satisfy f((SFNx*10+s) % (T))=f (OFi % (T)) respectively correspond to start times of time windows in an i-th sub-time-window set in the first time window set, where T is the first time length, OFi is an i-th offset in the first offset set, with % symbolizing modulus operation, SFNx is any system frame number, and s is any subframe number; the first time window set comprises Kx sub-time-window sets, and the i-th sub-time-window set is one of the Kx sub-time-window sets in the first time window set; f( ) is a function.

In one subembodiment, f( ) is rounding function.

In one subembodiment, f( ) is a function multiplied by N, where N is a positive integer.

In one embodiment, the rounding function includes rounding up or down to a nearest integer.

In one embodiment, an output by the function multiplied by N is N times the size of an input parameter, for instance f(x)=N*x.

In one embodiment, the first time window set comprises Kx sub-time-window sets, and any time window in an i-th sub-time-window set among the Kx sub-time-window sets starts with a subframe with a subframe number s in a system frame numbered with SFNx, then the SFNx and the s satisfy (SFNx*10+s) % (T)=OFi, where T is any time length in the first time length set, OFi is an i-th offset in the first offset set, with % symbolizing modulus operation.

In one embodiment, the first time window set comprises Kx sub-time-window sets, and any time window in an i-th sub-time-window set among the Kx sub-time-window sets starts with a subframe with a subframe number s in a system frame numbered with SFNx, then the SFNx and the s satisfy (SFNx*10+s) % (Tj)=OFi, where Tj is a j-th time length in the first time length set, OFi is an offset, with % symbolizing modulus operation.

In one embodiment, each time determined by system frames and subframes that satisfy (SFNx*10+s) % (Ti)=OF corresponds to a start of a time window in the first time window set, where SFNx is a system frame number, s is a subframe number, OF is an offset, and T1 is any time length in the first time length set, with % symbolizing modulus operation.

In one subembodiment, the first signaling comprises the OF.

In one embodiment, each time determined by system frames and subframes that satisfy (SFNx*10+s) % (Ti)=OF corresponds to a start of a time window in the first time window set, where SFNx is a system frame number, s is a subframe number, OF is an offset, and T1 is an i-th time length in the first time length set, with % symbolizing modulus operation.

In one subembodiment, the first signaling comprises the OF.

Embodiment 9

Figure 9:
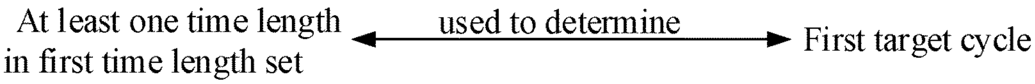
FIG. 9 illustrates a schematic diagram of at least one time length in a first time length set being used to determine a first target cycle according to one embodiment of the present application.

Embodiment 9 illustrates a schematic diagram of at least one time length in a first time length set being used to determine a first target cycle according to one embodiment of the present application, as shown in FIG. 9.

In one embodiment, a cycle of reference signals for radio link monitoring in the first reference signal resource set is Trs, where the first target cycle is a larger one of Trlm and the first time length.

In one embodiment, a cycle of reference signal resources for radio link monitoring in the first reference signal resource set is Trs, where the first target cycle is a larger one of Trlm and the first time length.

In one embodiment, the Trlm is a $T_{SSBCSI\text{-}RS}$ or a $T_{SSB}$.

In one embodiment, a cycle of SSBs for radio link monitoring in the first reference signal resource set is $T_{SSB}$, where the first target cycle is a larger one of $T_{SSB}$ and the first time length.

In one embodiment, a cycle of CSI-RSs for radio link monitoring in the first reference signal resource set is $T_{CSI\text{-}RS}$, where the first target cycle is a larger one of $T_{CSI\text{-}RS}$ and the first time length.

In one embodiment, a cycle of reference signal resources belonging to $\overline{q}_0$ in the first reference signal resource set is Tbfd, where the first target cycle is a larger one of Trs and the first time length.

In one embodiment, a cycle of reference signals belonging to $\overline{q}_0$ in the first reference signal resource set is Tbfd, where the first target cycle is a larger one of Trs and the first time length.

In one embodiment, the Trlm is a $T_{SSBCSI\text{-}RS}$ or a $T_{SSB}$.

In one embodiment, a cycle of SSBs belonging to $\overline{q}_0$ in the first reference signal resource set is $T_{SSB}$, where the first target cycle is a larger one of $T_{SSB}$ and the first time length.

In one embodiment, a cycle of SSB resources belonging to $\overline{q}_0$ in the first reference signal resource set is $T_{SSB}$, where the first target cycle is a larger one of $T_{SSB}$ and the first time length.

In one embodiment, a cycle of CSI-RSs belonging to $\overline{q}_0$ in the first reference signal resource set is $T_{CSI\text{-}RS}$, where the first target cycle is a larger one of $T_{CSI\text{-}RS}$ and the first time length.

In one embodiment, a cycle of CSI-RS resources belonging to $\overline{q}_0$ in the first reference signal resource set is $T_{CSI\text{-}RS}$, where the first target cycle is a larger one of $T_{CSI\text{-}RS}$ and the first time length.

In one embodiment, a cycle of reference signals for radio link monitoring in the first reference signal resource set is Trs, where the first target cycle is a larger one of Trlm and a longest time length in the first time length set.

In one embodiment, a cycle of reference signal resources for radio link monitoring in the first reference signal resource set is Trs, where the first target cycle is a larger one of Trlm and a longest time length in the first time length set.

In one embodiment, the Trlm is a $T_{SSBCSI\text{-}RS}$ or a $T_{SSB}$.

In one embodiment, a cycle of SSBs for radio link monitoring in the first reference signal resource set is $T_{SSB}$, where the first target cycle is a larger one of $T_{SSB}$ and a longest time length in the first time length set.

In one embodiment, a cycle of CSI-RSs for radio link monitoring in the first reference signal resource set is $T_{CSI\text{-}RS}$, where the first target cycle is a larger one of $T_{CSI\text{-}RS}$ and a longest time length in the first time length set.

In one embodiment, a cycle of reference signal resources belonging to $\overline{q}_0$ in the first reference signal resource set is Tbfd, where the first target cycle is a larger one of Trs and a longest time length in the first time length set.

In one embodiment, a cycle of reference signals belonging to $\overline{q}_0$ in the first reference signal resource set is Tbfd, where the first target cycle is a larger one of Trs and a longest time length in the first time length set.

In one embodiment, the Trlm is a $T_{SSBCSI\text{-}RS}$ or a $T_{SSB}$.

In one embodiment, a cycle of SSBs belonging to $\overline{q}_0$ in the first reference signal resource set is $T_{SSB}$, where the first target cycle is a larger one of $T_{SSB}$ and a longest time length in the first time length set.

In one embodiment, a cycle of SSB resources belonging to $\overline{q}_0$ in the first reference signal resource set is $T_{SSB}$, where the first target cycle is a larger one of $T_{SSB}$ and a longest time length in the first time length set.

In one embodiment, a cycle of CSI-RSs belonging to $\overline{q}_0$ in the first reference signal resource set is $T_{CSI\text{-}RS}$, where the first target cycle is a larger one of $T_{CSI\text{-}RS}$ and a longest time length in the first time length set.

In one embodiment, a cycle of CSI-RS resources belonging to $\overline{q}_0$ in the first reference signal resource set is $T_{CSI-RS}$, where the first target cycle is a larger one of $T_{CSI-RS}$ and a longest time length in the first time length set.

In one embodiment, a cycle of reference signals for radio link monitoring in the first reference signal resource set is Trs, where the first target cycle is a larger one of Trlm and a shortest time length in the first time length set.

In one embodiment, a cycle of reference signal resources for radio link monitoring in the first reference signal resource set is Trs, where the first target cycle is a larger one of Trlm and a shortest time length in the first time length set.

In one embodiment, the Trlm is a $T_{SSBCSI-RS}$ or a $T_{SSB}$.

In one embodiment, a cycle of SSBs for radio link monitoring in the first reference signal resource set is $T_{SSB}$, where the first target cycle is a larger one of $T_{SSB}$ and a shortest time length in the first time length set.

In one embodiment, a cycle of CSI-RSs for radio link monitoring in the first reference signal resource set is $T_{CSI-RS}$, where the first target cycle is a larger one of $T_{CSI-RS}$ and a shortest time length in the first time length set.

In one embodiment, a cycle of reference signal resources belonging to $\overline{q}_0$ in the first reference signal resource set is Tbfd, where the first target cycle is a larger one of Trs and a shortest time length in the first time length set.

In one embodiment, a cycle of reference signals belonging to $\overline{q}_0$ in the first reference signal resource set is Tbfd, where the first target cycle is a larger one of Trs and a shortest time length in the first time length set.

In one embodiment, the Trlm is a $T_{SSBCSI-RS}$ or a $T_{SSB}$.

In one embodiment, a cycle of SSBs belonging to $\overline{q}_0$ in the first reference signal resource set is $T_{SSB}$, where the first target cycle is a larger one of $T_{SSB}$ and a shortest time length in the first time length set.

In one embodiment, a cycle of SSB resources belonging to $\overline{q}_0$ in the first reference signal resource set is $T_{SSB}$, where the first target cycle is a larger one of $T_{SSB}$ and a shortest time length in the first time length set.

In one embodiment, a cycle of CSI-RSs belonging to $\overline{q}_0$ in the first reference signal resource set is $T_{CSI-RS}$, where the first target cycle is a larger one of $T_{CSI-RS}$ and a shortest time length in the first time length set.

In one embodiment, a cycle of CSI-RS resources belonging to $\overline{q}_0$ in the first reference signal resource set is $T_{CSI-RS}$, where the first target cycle is a larger one of $T_{CSI-RS}$ and a shortest time length in the first time length set.

In one embodiment, a cycle of reference signals for radio link monitoring in the first reference signal resource set is Trs, where the first target cycle is a larger one of Trlm and a weighted average of all time lengths in the first time length set.

In one embodiment, a cycle of reference signal resources for radio link monitoring in the first reference signal resource set is Trs, where the first target cycle is a larger one of Trlm and a weighted average of all time lengths in the first time length set.

In one embodiment, the Trlm is a $T_{SSBCSI-RS}$ or a $T_{SSB}$.

In one embodiment, a cycle of SSBs for radio link monitoring in the first reference signal resource set is $T_{SSB}$, where the first target cycle is a larger one of $T_{SSB}$ and a weighted average of all time lengths in the first time length set.

In one embodiment, a cycle of CSI-RSs for radio link monitoring in the first reference signal resource set is $T_{CSI-RS}$, where the first target cycle is a larger one of $T_{CSI-RS}$ and a weighted average of all time lengths in the first time length set.

In one embodiment, a cycle of reference signal resources belonging to $\overline{q}_0$ in the first reference signal resource set is Tbfd, where the first target cycle is a larger one of Trs and a weighted average of all time lengths in the first time length set.

In one embodiment, a cycle of reference signals belonging to $\overline{q}_0$ in the first reference signal resource set is Tbfd, where the first target cycle is a larger one of Trs and a weighted average of all time lengths in the first time length set.

In one embodiment, the Trlm is a $T_{SSBCSI-RS}$ or a $T_{SSB}$.

In one embodiment, a cycle of SSBs belonging to $\overline{q}_0$ in the first reference signal resource set is $T_{SSB}$, where the first target cycle is a larger one of $T_{SSB}$ and a weighted average of all time lengths in the first time length set.

In one embodiment, a cycle of SSB resources belonging to $\overline{q}_0$ in the first reference signal resource set is $T_{SSB}$, where the first target cycle is a larger one of $T_{SSB}$ and a weighted average of all time lengths in the first time length set.

In one embodiment, a cycle of CSI-RSs belonging to $\overline{q}_0$ in the first reference signal resource set is $T_{CSI-RS}$, where the first target cycle is a larger one of $T_{CSI-RS}$ and a weighted average of all time lengths in the first time length set.

In one embodiment, a cycle of CSI-RS resources belonging to $\overline{q}_0$ in the first reference signal resource set is $T_{CSI-RS}$, where the first target cycle is a larger one of $T_{CSI-RS}$ and a weighted average of all time lengths in the first time length set.

Embodiment 10

Figure 10:
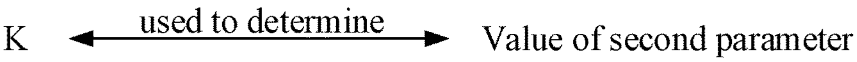
FIG. 10 illustrates a schematic diagram of K being used to determine a second parameter's value according to one embodiment of the present application.

Embodiment 10 illustrates a schematic diagram of K being used to determine a second parameter's value according to one embodiment of the present application, as shown in FIG. 10.

In one embodiment, the first time length set only comprises the first time length.

In one embodiment, a number of DRXs configured by the first signaling is K, where K is a positive integer greater than 1.

In one embodiment, K is used to determine a value of the second parameter.

In one embodiment, the K DRXs configured by the first signaling respectively correspond to K consecutive time windows in the first time window set.

In one embodiment, a value of the second parameter is related to a reciprocal of K.

In one embodiment, a value of the second parameter is related to a reciprocal of K+n, where n is a non-zero integer.

In one embodiment, a value of the second parameter is linear with K.

In one embodiment, a value of the second parameter is linear with a reciprocal of K.

In one embodiment, a value of the second parameter is related to K+n, where n is a non-zero integer.

In one embodiment, a value of the second parameter is related to an approximate value of a reciprocal of K.

In one embodiment, a value of the second parameter is related to an approximate value of a reciprocal of K+n, where n is a non-zero integer.

In one embodiment, a value of the second parameter is linear with K.

In one embodiment, a value of the second parameter is linear with an approximate value of a reciprocal of K.

In one embodiment, a value of the second parameter is related to K+n, where n is a non-zero integer.

In one embodiment, a value of the second parameter is related to 1/(1−1/K).

In one embodiment, a value of the second parameter is equal to a reciprocal of K.

In one embodiment, a value of the second parameter is equal to a reciprocal of K+n, where n is a non-zero integer.

In one embodiment, a value of the second parameter is equal to K.

In one embodiment, a value of the second parameter is equal to K+n, where n is a non-zero integer.

In one embodiment, a value of the second parameter is equal to an approximate value of a reciprocal of K.

In one embodiment, a value of the second parameter is equal to an approximate value of a reciprocal of K+n, where n is a non-zero integer.

In one embodiment, a value of the second parameter is equal to K+n, where n is a non-zero integer.

In one embodiment, a value of the second parameter is equal to 1/(1−1/K).

In one embodiment, n is equal to one of −1, 1, −2, or 2.

In one embodiment, the second parameter is not a constant.

In one embodiment, the second parameter is unrelated to whether the first radio link quality evaluation is for FR2.

In one embodiment, the second parameter is unrelated to whether the first reference signal resource set is SSBs or CSI-RSs.

In one embodiment, the second parameter is unrelated to whether the first reference signal resource set is SSB resources or CSI-RS resources.

In one embodiment, the second parameter is unrelated to the density of CSI-RS.

In one embodiment, the second parameter is unrelated to types of a cell and a network that CSI-RS resources in the first reference signal resource set are for.

In one embodiment, the approximate value is an approximate value for a first number after decimal point.

In one embodiment, the approximate value is an approximate value for a second number after decimal point.

In one embodiment, the approximate value is an approximate value for a third number after decimal point.

In one embodiment, the second parameter is unrelated to the determination of the first target cycle.

In one embodiment, the second parameter is related to the determination of the first target cycle.

Embodiment 11

Figure 11:
FIG. 11 illustrates a schematic diagram of a first value being linearly correlated with a product of a first parameter and a second parameter according to one embodiment of the present application.

Embodiment 11 illustrates a schematic diagram of a first value being linearly correlated with a product of a first parameter and a second parameter according to one embodiment of the present application, as shown in FIG. 11.

In one embodiment, the first value satisfies P×L×S+a, where P is the first parameter, and L represents the second parameter.

In one embodiment, a is equal to 0.

In one embodiment, a is unequal to 0.

In one embodiment, a is related to a number of candidate time intervals in the first candidate time interval set.

In one embodiment, a is equal to a number of candidate time intervals in the first candidate time interval set.

In one embodiment, the first signaling is used to indicate the a.

In one embodiment, S is equal to 1.

In one embodiment, a loose measurement criterion is not satisfied for FR1, while the first reference signal resource set is for an SSB, then the first value is equal to P×L.

In one embodiment, the S satisfies C×S01, where C is a third parameter.

In one embodiment, S01 is equal to 1.

In one embodiment, a third parameter is a real constant, and the first value is linear with a product of the first parameter, the second parameter and the third parameter.

In one embodiment, the S01 is a parameter in a seventh parameter set.

In one embodiment, the S01 is a product of multiple parameters in a seventh parameter set.

In one embodiment, the S01 satisfies N×S02, where N is a fourth parameter.

In one embodiment, S02 is equal to 1.

In one embodiment, the S02 is a parameter in a seventh parameter set.

In one embodiment, the S02 is a product of multiple parameters in a seventh parameter set.

In one embodiment, a fourth parameter is related only to FR2 of FR1 and FR2, and the first value is linear with a product of the first parameter, the second parameter and the fourth parameter;

herein, the action of performing a first radio link quality evaluation of a first reference signal resource set within a first evaluation cycle is for FR2.

In one embodiment, when the action of performing a first radio link quality evaluation of a first reference signal resource set within a first evaluation cycle is for FR2, the fourth parameter is applied; when the action of performing a first radio link quality evaluation of a first reference signal resource set within a first evaluation cycle is for FR1, the fourth parameter is not applied.

In one embodiment, the first parameter is related to FR1.

In one embodiment, the first parameter is related to FR2.

In one embodiment, the second parameter is related to FR1.

In one embodiment, the second parameter is related to FR2.

In one embodiment, the third parameter is related to FR1.

In one embodiment, the third parameter is related to FR2.

In one embodiment, a fifth parameter is related to a type of reference signal resources in the first reference signal resource set.

In one embodiment, when the type of the reference signal resources in the first reference signal resource set is CSI-RS and a density of the reference signal resources in the first reference signal resource set satisfies a first density, the first value is linear with a product of the first parameter, the second parameter and the fifth parameter; when the type of the reference signal resources in the first reference signal resource set is SSB, the first value is unrelated to the fifth parameter; when the type of the reference signal resources in the first reference signal resource set is CSI-RS but the density of the reference signal resources in the first reference signal resource set does not satisfy the first density, the first value is unrelated to the fifth parameter.

In one embodiment, the S satisfies $M_{in}$×S11, where $M_{in}$ is a fifth parameter, the first radio link quality evaluation being for a deactivated PSCell.

In one subembodiment, the first radio link quality evaluation is used for radio link monitoring (RLM).

In one embodiment, the S satisfies $M_{out}$×S11, where $M_{out}$ is a fifth parameter, the first radio link quality evaluation being for a deactivated PSCell.

In one subembodiment, the first radio link quality evaluation is used for radio link monitoring (RLM).

In one embodiment, the S satisfies $M_{BFD}\times S11$, where $M_{BFD}$ is a fifth parameter, the first radio link quality evaluation being for a deactivated PSCell.

In one subembodiment, the first radio link quality evaluation is used for beam failure monitoring.

In one embodiment, S11 is equal to 1.

In one embodiment, the S11 is a parameter in a seventh parameter set.

In one embodiment, the S11 is a product of multiple parameters in a seventh parameter set.

In one embodiment, the S11 is equal to N, where N is the fourth parameter.

In one embodiment, the S11 satisfies $N\times S12$, where N is the fourth parameter.

In one embodiment, the S12 is a parameter in a seventh parameter set.

In one embodiment, the S12 is a product of multiple parameters in a seventh parameter set.

In one embodiment, the S satisfies $C\times M_{in}\times S21$, where $M_{in}$ is a fifth parameter.

In one subembodiment, the first radio link quality evaluation is used for radio link monitoring (RLM).

In one embodiment, the S satisfies $C\times M_{out}\times S21$, where $M_{out}$ is a fifth parameter.

In one subembodiment, the first radio link quality evaluation is used for radio link monitoring (RLM).

In one embodiment, the S satisfies $C\times M_{BFD}\times S21$, where $M_{BFD}$ is a fifth parameter, the first radio link quality evaluation being for beam failure monitoring.

In one embodiment, S21 is equal to 1.

In one embodiment, the S21 is a parameter in a seventh parameter set.

In one embodiment, the S21 is a product of multiple parameters in a seventh parameter set.

In one embodiment, the S21 is equal to N, where N is the fourth parameter.

In one embodiment, the S21 satisfies $N\times S22$, where N is the fourth parameter.

In one embodiment, the S22 is a parameter in a seventh parameter set.

In one embodiment, the S22 is a product of multiple parameters in a seventh parameter set.

In one embodiment, a seventh parameter set is related to a loose measurement criterion.

In one embodiment, the first value is linear with a product of the first parameter, the second parameter and any parameter in the seventh parameter set.

In one embodiment, when a loose measurement criterion is satisfied, parameter(s) in the seventh parameter set is(are) used to determine the first value.

In one embodiment, when a loose measurement criterion is unsatisfied, parameter(s) in the seventh parameter set is(are) not used to determine the first value.

In one embodiment, when the UE is stationary, a loose measurement criterion is satisfied.

In one embodiment, when a change of RSRP does not exceed a specific threshold, a loose measurement criterion is satisfied.

In one embodiment, parameter(s) in the seventh parameter set is(are) used for increasing the first value to reduce power consumption.

Embodiment 12

Figure 12:
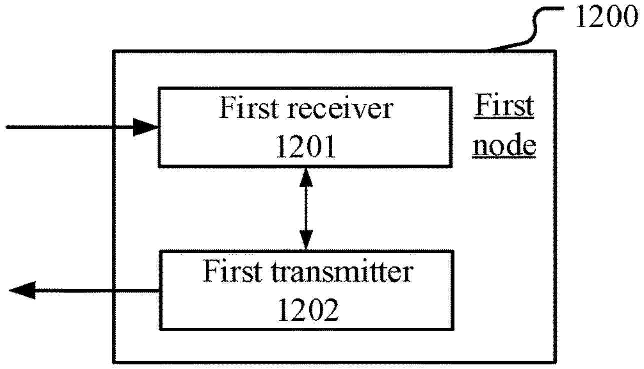
FIG. 12 illustrates a structure block diagram of a processing device in a first node according to one embodiment of the present application.

Embodiment 12 illustrates a structure block diagram of a processing device used in a first node according to one embodiment of the present application; as shown in FIG. 12. In FIG. 12, a processing device 1200 in a first node is comprised of a first receiver 1201 and a first transmitter 1202. In Embodiment 12, the first receiver 1201 receives a first signaling, the first signaling used for configuring DRX of a first cell group; the DRX of the first cell group configured by the first signaling being for a first MAC entity;

the first receiver 1201 listens over a PDCCH within active time of any DRX group corresponding to the first cell group;

the first receiver 1201 performs a first radio link quality evaluation of a first reference signal resource set within a first evaluation cycle to determine whether a result of the first radio link quality evaluation is worse than a first threshold;

herein, the first signaling comprises a first time length set, the first time length set comprising at least a first time length; any time length in the first time length set is a first-type DRX cycle; a system frame number, a subframe number and the first time length set are used together to determine a first time window set; the active time of the DRX group corresponding to the first cell group comprises the first time window set; a time interval between any two adjacent time windows in the first time window set is a candidate time interval in a first candidate time interval set and the first candidate time interval set comprises at least a first time interval and a second time interval, the first time interval being unequal to the second time interval; the first evaluation cycle comprises Q1 first target cycles; the first target cycle is a candidate cycle in a first candidate cycle set, at least one time length in the first time length set being used to determine the first target cycle; Q1 is a positive integer; a first parameter is dependent on a measurement gap, while a second parameter is dependent on the first candidate time interval set, a first value is linear with a product of the first parameter and the second parameter, and a result yielded by rounding the first value up to a nearest integer is equal to Q1; the DRX of the first cell group configured by the first signaling is unrelated to PTM.

In one embodiment, the first time length set only comprises the first time length; a number of DRXs configured by the first signaling is K, where K is a positive integer greater than 1; K is used to determine a value of the second parameter; the K DRXs configured by the first signaling respectively correspond to K consecutive time windows in the first time window set.

In one embodiment, any time window in the first time window set corresponds to one time of running of a first-type DRX timer; a name of the first-type DRX timer includes onduration.

In one embodiment, the first time length set only comprises the first time length; any DRX cycle determined by the first time length comprises K time windows in the first time window set, K being used to determine the second parameter.

In one embodiment, a third parameter is a real constant, and the first value is linear with a product of the first parameter, the second parameter and the third parameter.

In one embodiment, a fourth parameter is related only to FR2 of FR1 and FR2, and the first value is linear with a product of the first parameter, the second parameter and the fourth parameter;

herein, the action of performing a first radio link quality evaluation of a first reference signal resource set within a first evaluation cycle is for FR2.

In one embodiment, a fifth parameter is related to a type of reference signal resources in the first reference signal resource set; when the type of the reference signal resources in the first reference signal resource set is CSI-RS and a density of the reference signal resources in the first reference signal resource set satisfies a first density, the first value is linear with a product of the first parameter, the second parameter and the fifth parameter; when the type of the reference signal resources in the first reference signal resource set is SSB, the first value is unrelated to the fifth parameter; when the type of the reference signal resources in the first reference signal resource set is CSI-RS but the density of the reference signal resources in the first reference signal resource set does not satisfy the first density, the first value is unrelated to the fifth parameter.

In one embodiment, a sixth parameter is related to types of a cell and a network that CSI-RS resources in the first reference signal resource set are for, and the first value is linear with a product of the first parameter, the second parameter and the sixth parameter; the first radio link quality evaluation is a beam failure detection.

In one embodiment, a seventh parameter set is related to a loose measurement criterion; the first value is linear with a product of the first parameter, the second parameter and any parameter in the seventh parameter set.

In one embodiment, an eighth parameter is related to a number of elements in the first candidate time interval set, and an eighth parameter set comprises at least the first parameter; when the number of the elements in the first candidate time interval set is greater than 1, the first value is equal to a sum of the eighth parameter and a product of the second parameter and at least the first parameter in the eighth parameter set.

In one embodiment, the first node is a UE.

In one embodiment, the first node is a terminal supporting large delay difference.

In one embodiment, the first node is a terminal supporting NTN.

In one embodiment, the first node is an aircraft or vessel.

In one embodiment, the first node is a cellphone or vehicle-mounted terminal.

In one embodiment, the first node is a relay UE and/or a U2N remote UE.

In one embodiment, the first node is an IoT terminal or IIoT terminal.

In one embodiment, the first node is a piece of equipment supporting transmissions with low delay and high reliability.

In one embodiment, the first node is a sidelink communication node.

In one embodiment, the first receiver 1201 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1202 comprises at least one of the antenna 452, the transmitter 454, the transmitting processor 468, the multi-antenna transmitting processor 457, the controller/processor 459, the memory 460 or the data source 467 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, satellite communication equipment, ship communication equipment, and NTN UE, etc. The base station or system device in the present application includes but is not limited to macro-cellular base stations, micro-cellular base stations, home base stations, relay base station, gNB (NR node B), Transmitter Receiver Point (TRP), NTN base station, satellite equipment and fight platform, and other radio communication equipment.

This disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first user equipment (UE), the UE comprising:
- a transceiver; and
- a processor, wherein the transceiver and the processor are configured to:
- receive a first signal indicative of Discontinuous Reception (DRX) configuration associated with a first cell group for a Medium Access Control (MAC) entity;
- determine, based on the signal, one or more DRX cycle lengths;
- determine a set of active time windows for the DRX of the first cell group based on: the one or more DRX cycle lengths, a system frame number, and a subframe number;
- monitor a Physical Downlink Control Channel (PDCCH) during the set of active time windows;
- determine a plurality of time intervals between adjacent active time windows of the set of active time windows, wherein the plurality of time intervals include at least two different values;
- perform a radio link quality measurement on a reference signal resource set within an evaluation cycle;
- determine whether a result of the radio link quality measurement is below a threshold;
- determine a number of measurement cycles within the evaluation cycle, wherein the number is based on: a first parameter associated with a measurement gap, and a second parameter associated with the plurality of time intervals; and
- apply the DRX configuration for the first cell group, wherein the DRX configuration is independent of point-to-multipoint (PTM) operation.

2. The UE according to claim 1, wherein:
- the one or more DRX cycle lengths comprise a single DRX cycle length, or
- a plurality of DRX cycles are configured by the signal, wherein a number of the plurality of DRX cycles is used to determine a value of the second parameter, and wherein the number of the plurality of DRX cycles configured by the signal respectively correspond to equal number of consecutive time windows in the set of active time windows.

3. The UE according to claim 2, wherein:

each active time window in the first set of active time windows corresponds to one execution of a DRX on-duration timer.

4. The UE according to claim 1, wherein:

the one or more DRX cycle lengths comprise a single DRX cycle length, and wherein a number of active windows within the DRX cycle is used to determine the second parameter.

5. The UE according to claim 1, wherein:

a third parameter is a real constant, and the number of measurement cycles is based on a product of the first parameter, the second parameter and the third parameter.

6. The UE according to claim 4, wherein:

a third parameter is a real constant, and the number of measurement cycles is based on a product of the first parameter, the second parameter and the third parameter.

7. The UE according to claim 1, wherein:

a fourth parameter is associated with Frequency Range 2 (FR2), and the number of measurement cycles is further based on a product of the first parameter, the second parameter and the fourth parameter, and wherein the radio link quality measurement is performed for FR2.

8. The UE according to claim 4, wherein:

a fourth parameter is associated with FR2, and the number of measurement cycles is further based on a product of the first parameter, the second parameter and the fourth parameter, and wherein the radio link quality measurement is performed for FR2.

9. The UE according to claim 1, wherein:

a fifth parameter is related to a type of reference signal resources, and wherein:

on a condition that the type of the reference signal resources is Channel State Information-Reference Signal (CSI-RS) and a density of the reference signal resources is more than a threshold density, the number of measurement cycles is further based on a product of the first parameter, the second parameter and the fifth parameter, and on a condition that the type of the reference signal resources in the first reference signal resource set is Synchronization Signal Block (SS-Block, i.e., SSB), the number of measurement cycles is independent of the fifth parameter, and on a condition that the type of the reference signal resources is the CSI-RS but the density of the reference signal resources is not more than the threshold density, the number of measurement cycles is independent of the fifth parameter.

10. The UE according to claim 4, wherein:

a fifth parameter is related to a type of reference signal resources, and wherein:

on a condition that the type of the reference signal resources is CSI-RS and a density of the reference signal resources is more than a threshold density, the number of measurement cycles is further based on a product of the first parameter, the second parameter and the fifth parameter, and on a condition that the type of the reference signal resources is SSB, the number of measurement cycles is independent of the fifth parameter, and on a condition that the type of the reference signal resources is the CSI-RS but the density of the reference signal resources is not more than the threshold density, the number of measurement cycles is independent of the fifth parameter.

11. The UE according to claim 1, wherein:

a sixth parameter is associated with a type of cell or network associated with CSI-RS resources, and the number of measurement cycles is further based on a product of the first parameter, the second parameter and the sixth parameter, and wherein radio link quality measurement comprises beam failure detection.

12. The UE according to claim 4, wherein:

a sixth parameter is associated with a type of cell or network associated with CSI-RS resources, and the number of measurement cycles is further based on a product of the first parameter, the second parameter and the sixth parameter, and wherein radio link quality measurement comprises beam failure detection.

13. The UE according to claim 1, wherein:

a seventh parameter set is associated with a loose measurement criterion, and wherein the number of measurement cycles is further based on a product of the first parameter, the second parameter and any parameter in the seventh parameter set.

14. The UE according to claim 4, characterized in that a seventh parameter set is associated with a loose measurement criterion, and wherein the number of measurement cycles is further based on a product of the first parameter, the second parameter and any parameter in the seventh parameter set.

15. The UE according to claim 1, wherein:

an eighth parameter is associated with a number of elements in the plurality of time intervals, and an eighth parameter set comprises at least the first parameter, and wherein:

on a condition that the number of the elements in the plurality of time intervals is greater than 1, the number of measurement cycles is equal to a sum of the eighth parameter and a product of the second parameter and at least the first parameter in the eighth parameter set.

16. The UE according to claim 4, wherein:

an eighth parameter is associated with a number of elements in the plurality of time intervals, and an eighth parameter set comprises at least the first parameter, and wherein:

on a condition that the number of the elements in the plurality of time intervals is greater than 1, the number of measurement cycles is based on a sum of the eighth parameter and a product of the second parameter and at least the first parameter in the eighth parameter set.

17. The UE according to claim 1, wherein the one or more DRX cycle lengths comprise a long DRX cycle.

18. The UE according to claim 1, wherein the one or more DRX cycle lengths comprise a plurality of time lengths, and wherein the signal further indicates a cycle formed by a sum of at least two of the plurality of time lengths.

19. The UE according to claim 18, wherein the signal comprises a template used to determine the set of active time windows, and wherein the template indicates a set of consecutive active time windows.

20. A method in a user equipment (UE), the method comprising:

receiving a signal, indicative of Discontinuous Reception (DRX) configuration associated with a first cell group for a Medium Access Control (MAC) entity;

determining, based on the signal, one or more DRX cycle lengths;

determining a set of active time windows for the DRX of the first cell group based on: the one or more DRX cycle lengths, a system frame number, and a subframe number;

monitoring a Physical Downlink Control Channel (PDCCH) during the set of active time windows;

determining a plurality of time intervals between adjacent active time windows of the set of active time windows, wherein the plurality of time intervals include at least two different values;

performing a radio link quality measurement on a reference signal resource set within an evaluation cycle;

determining whether a result of the radio link quality measurement is below a threshold;

determining a number of measurement cycles within the evaluation cycle, wherein the number is based on: a first parameter associated with a measurement gap, and a second parameter associated with the plurality of time intervals; and applying the DRX configuration for the first cell group, wherein the DRX configuration is independent of point-to-multipoint (PTM) operation.

* * * * *